(12) United States Patent
Chen et al.

(10) Patent No.: US 11,685,237 B2
(45) Date of Patent: Jun. 27, 2023

(54) LIGHT-TRANSMISSIVE PLASTIC PLATE STRUCTURE WITH CURVED SURFACE AND METHOD FOR FABRICATING THE SAME

(71) Applicant: Enflex Corporation, Taoyuan (TW)

(72) Inventors: Hsin Yuan Chen, Taoyuan (TW); Jui Lin Hsu, Taoyuan (TW); Lung Hsiang Peng, Taoyuan (TW); Teng Hsiang Wei, Taoyuan (TW); Yong-Xin Chen, Taoyuan (TW); Zong Yang Li, Taoyuan (TW)

(73) Assignee: Enflex Corporation, Tainan (TW)

( * ) Notice: Subject to any disclaimer, the term of this patent is extended or adjusted under 35 U.S.C. 154(b) by 583 days.

(21) Appl. No.: 16/738,933

(22) Filed: Jan. 9, 2020

(65) Prior Publication Data

US 2021/0008964 A1 Jan. 14, 2021

(51) Int. Cl.
*B32B 3/06* (2006.01)
*B60J 3/00* (2006.01)
(Continued)

(52) U.S. Cl.
CPC ......... *B60J 3/007* (2013.01); *B29C 45/14336* (2013.01); *B29C 51/082* (2013.01);
(Continued)

(58) Field of Classification Search
CPC .. G02B 5/28; G02B 5/281–283; G02B 5/285; G02B 1/113; G02B 1/115;
(Continued)

(56) References Cited

U.S. PATENT DOCUMENTS 4,551,372 A * 11/1985 Kunert .............. B32B 17/10293
428/81
4,994,315 A * 2/1991 Schreiber ................. B60J 10/45
428/76

(Continued)

*Primary Examiner* — Z. Jim Yang

(57) ABSTRACT

The invention refers to a light-transmissive plastic plate structure suitable for vehicle sunroof with curved surface and a method for fabricating the same. By using polymer material formulation, UV resistant coating formulation and precision coating technology, the wear resistance of polymer surface of plastic substrate can be improved to the same level as glass, and the original optical and physical properties after various environmental tests can also be maintained. The plastic substrate is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts. The light-transmissive plastic plate structure with curved surface comprises a lightweight polymer sunroof and a lightweight plastic connecting structure fixed to the sunroof by insert-molding injection, which can reduce the weight of traditional glass sunroof, front and rear windshield, and side window glass assembly, and is particularly suitable for use in oil-electric hybrid vehicles and pure-electric vehicles that require lightweight specifications.

5 Claims, 14 Drawing Sheets

(51) Int. Cl.
*B29C 51/08* (2006.01)
*B29C 45/14* (2006.01)
*B29C 51/26* (2006.01)
*B32B 27/36* (2006.01)
*B32B 27/30* (2006.01)
*B32B 3/02* (2006.01)
*B29L 31/30* (2006.01)
*B60J 7/043* (2006.01)
*B32B 3/08* (2006.01)
*B32B 7/12* (2006.01)
*B32B 27/08* (2006.01)

(52) U.S. Cl.
CPC ............ *B29C 51/266* (2013.01); *B32B 3/02* (2013.01); *B32B 27/30* (2013.01); *B32B 27/365* (2013.01); *B29L 2031/30* (2013.01); *B32B 3/06* (2013.01); *B32B 3/08* (2013.01); *B32B 7/12* (2013.01); *B32B 27/08* (2013.01); *B32B 2255/20* (2013.01); *B32B 2255/28* (2013.01); *B32B 2307/418* (2013.01); *B60J 7/043* (2013.01)

(58) Field of Classification Search
CPC .. G02B 1/14; G02B 6/0095; C03C 2217/734; B60J 7/00–053; B60J 10/30–82; Y10T 428/24777; B32B 3/02; B32B 3/04; B32B 17/10155; B32B 17/10293; B32B 17/10302; B32B 2605/006
See application file for complete search history.

(56) References Cited

U.S. PATENT DOCUMENTS

| | | | | |
|---|---|---|---|---|
| 5,409,290 | A * | 4/1995 | Grimm | B29C 70/78 49/501 |
| 5,786,067 | A * | 7/1998 | Gold | B60J 10/45 156/196 |
| 7,066,374 | B2 * | 6/2006 | Tiesler | B29C 66/474 296/214 |
| 2002/0022115 | A1 * | 2/2002 | Brandner | B60J 1/10 428/435 |
| 2006/0086765 | A1 * | 4/2006 | Harberts | F16J 15/025 224/309 |
| 2007/0002432 | A1 * | 1/2007 | Chen | G02B 5/208 359/359 |
| 2012/0141751 | A1 * | 6/2012 | Breuling | B32B 7/05 428/201 |
| 2014/0204601 | A1 * | 7/2014 | Bauerle | B60Q 3/208 29/428 |
| 2014/0369063 | A1 * | 12/2014 | Kleo | G02B 6/0095 362/551 |
| 2016/0001645 | A1 * | 1/2016 | Ortmueller | B60J 10/20 403/288 |
| 2016/0215148 | A1 * | 7/2016 | Schmidt | B32B 27/308 |
| 2018/0111355 | A1 * | 4/2018 | Manz | B60J 10/90 |
| 2018/0154752 | A1 * | 6/2018 | Trombetta | B60J 1/004 |
| 2018/0326831 | A1 * | 11/2018 | Bott | B60J 7/22 |
| 2019/0193376 | A1 * | 6/2019 | Bauerle | B60Q 1/2696 |
| 2020/0094663 | A1 * | 3/2020 | Uchida | B60J 10/82 |
| 2020/0262482 | A1 * | 8/2020 | Makowski | B62D 25/12 |
| 2020/0346591 | A1 * | 11/2020 | Butsch | B32B 27/365 |

* cited by examiner

LIGHT-TRANSMISSIVE PLASTIC PLATE STRUCTURE WITH CURVED SURFACE AND METHOD FOR FABRICATING THE SAME

BACKGROUND OF INVENTION

1. Field of the Invention

The invention refers to a light-transmissive plastic plate structure with curved surface and method for fabricating the same, more particularly to a structure of plastic plate which is first formed into a curved plastic plate through a hot pressing process, and then a connecting structure is formed and fixed on the plastic plate by an insert-molding injection process in order to form the structure of car sunroof mechanism.

2. Description of the Prior Art

Traditional cars usually use glass to produce sunroofs, windshields, and side windows. However, because glass has the disadvantages of heavy in weight, fragile, and difficult to shape; in recent years, some people have developed plastic materials that are light-transmissive to replace traditional glass for the production of car sunroofs, windshields, and side windows.

There are various kinds of plastics, in which, engineering plastics made of polycarbonate (PC for short) have high transparency and free dyeability, high strength and coefficient of elasticity, high impact strength, wide operatible temperature range, low molding shrinkage, good dimensional stability, and good weather resistance, tasteless and odorless, harmless to, the human body, in line with health and safety, easy to shape, etc., and thus is suitable to be used to make transparent plastic plates with curved surfaces or special structures, in order to replace the fragile and difficult to shape glass plates. For example, car sunroofs are usually made of polycarbonate (PC). However, polycarbonate (PC) also has the deficiencies such as poor wear resistance and easy yellowing under ultraviolet radiation and etc.. Therefore, in the prior arts, a wear-resistant hard layer is formed on the outer surface of the polycarbonate (PC) substrate, and an ultraviolet (UV) absorbing material is added in the substrate, in order to improve the wear-resistant ability and reduce the yellowing phenomenon of the substrate. Such method is to "absorb" the UV light. UV light will still enter the PC substrate and then be blocked. Although it has the function to blocking UV from entering the car, it will still cause UV yellowing and UV degradation of the substrate itself.

In addition, in order to have a fashionable sense of design and aesthetic visual feeling in appearance and shape, today's car sunroofs are no longer simply flat structures, but mostly plastic plates with smooth and curved surfaces. When making the plastic plates, although plastic injection molding technology has the advantages of fast manufacturing process and mass production, it also has the disadvantages of complicated mold design, high equipment cost, and unsuitable for making large-sized or large-scaled products. In contrast, although hot-press molding technology cannot provide the production speed as fast as plastic injection, it has the advantages of simple mold, low cost, simple process, and suitable for making large-sized or large-scaled products. Therefore, for car sunroofs with a size larger than 60 cm×40 cm (length multiple width), it is a more appropriate choice to use hot-press molding technology for production.

Moreover, regardless of the conventional car sunroofs which are made of either plastic or glass plates, the connecting structure (or mechanism) thereof used for connecting the car body is always made of metal and is adhered to the plastic plate (or glass plate) by using adhesive. Please refer to FIG. 1A and FIG. 1B, which respectively are a schematic sectional view and a bottom view of the connecting structure adhered to the glass plate with curved surface by using adhesive. As shown in FIG. 1A and FIG. 1B, because the plastic plate (or glass plate) 01 for producing the car sunroof is made of hard plate with curved surface, therefore, when the metal connecting structure (which is also a hard material) is attached on the connecting structure 03 (or mechanism) made of metal by adhesive 02, it is inevitable that the joint surface between the plastic plate (or glass plate) 01 and the connecting structure 03 (or mechanism) will contain gaps; not only the effect of waterproofing and moisture-proofing is reduced, but also the combination strength of these two parts is worse. Furthermore, the connecting structure 03 (or mechanism) made of metal also has the deficiencies of heavier in weight (causing the vehicle to consume more fuel and electricity during driving), fragile, lack of anti-ultraviolet (UV) and thermal insulation effects, and poor adhesion between metal and plastic (or glass) plates, and thus leaves a room for improvements.

SUMMARY OF THE INVENTION

The primary objective of the invention is to provide a light-transmissive plastic plate structure suitable for vehicle sunroof with curved surface and a method for fabricating the same. The plastic substrate is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts. The light-transmissive plastic plate structure with curved surface comprises a lightweight polymer sunroof and a lightweight plastic connecting structure fixed to the sunroof by insert-molding injection, which can reduce the weight of traditional glass sunroof, front and rear windshield, and side window glass assembly.

Another objective of the invention is to provide a light-transmissive plastic plate structure suitable for vehicle sunroof with curved surface; wherein, a coated film layer is furnished on the outer surface of the plastic substrate by using polymer material formulation, UV resistant coating formulation and precision coating technology, the wear resistance of polymer surface of plastic substrate can be improved to the same level as glass, and the original optical and physical properties after various environmental tests can also be maintained. The light-transmissive plastic plate structure with curved surface of the invention not only is suitable for car sunroof substrate made of polycarbonate (PC) engineering plastics, but also contains a multi-layer coating structure with good wear-resistant and UV-resistant effects.

A further objective of the invention is to provide a method for fabricating a light-transmissive plastic plate structure with curved surface by using a mold-pressing process. The plastic substrate is first heated to a first predetermined temperature in advance; thereafter, the substrate is cooled to a second predetermined temperature by a cooling process and is also proceeded with a pressure-molding process by using a mold at the same time. Then, a cutting process is used to cut the outer contour of the substrate after the pressure-molding process in order to make a plastic plate with a predetermined contour. Compared with the conventional technology, the method for manufacturing a light-transmissive plastic plate structure with a curved surface by pressure-molding according to the present invention can have the advantages of increasing the shape and appearance adjustment space of the plastic plate, and integrating the plastic plate design.

In order to achieve the aforementioned objectives, the invention provides a light-transmissive plastic plate structure with curved surface, comprising: a substrate, said substrate at least comprising a transparent hard plastic material and having an outer surface and an inner surface opposite to the outer surface; a primer layer, furnished at an outer rim area of the inner surface of the substrate; and a connecting structure, fixed to the outer rim area of the inner surface of the substrate at a position having the primer layer.

In a preferred embodiment, the light-transmissive plastic plate structure with curved surface further comprises at least one sealing ring layer. The sealing ring layer is disposed on a surface of the primer layer facing the connecting structure, such that the sealing ring layer is sandwiched between adjoining surfaces of the primer layer and the connecting structure.

In a preferred embodiment, the substrate has a curved surface at least at the outer rim area of the inner surface; the connecting structure is for connecting to an external component, such that the substrate can be connected to the external component through the connecting structure; the connecting structure is made of hard plastic material or metal material; wherein, when the connecting structure is made of hard plastic material, the connecting structure is molded and fixed on the outer rim area of the inner surface of the substrate having the primer layer by using an insert-molding injection process; in addition, the hard plastic material of the connecting structure includes at least one of the following: polymethyl methacrylate (PMMA), polycarbonate (PC), acrylonitrile butadiene styrene (ABS), polypyromellitimide (PMMI), polyethylene terephthalate (PET), polyethylene 2,6-naphthalene dicarboxylate (PEN), polyethersulfone (PES), and Polyimide (PI); wherein, when the connecting structure is made of metal material, the connecting structure is adhered and fixed to the outer rim area of the inner surface of the substrate at a position having the primer layer by using the primer layer as an adhesive; the primer layer comprises one of the following materials: compounds of amines and heterocyclic amines, silane compounds, and polyurethane (PU), and is for providing good adhesion effect between the substrate and the connecting structure; each said sealing ring layer is applied on the surface of the primer layer facing the connecting structure by a dispensing method, and is extending in a ring shape around the outer rim area of the inner surface of the substrate having the primer layer; the material of the sealing ring layer includes one of the following: silicone and polyurethane (PU), which is for improving the sealing effect between the substrate and the connecting structure.

In a preferred embodiment, the substrate is a multilayer structure comprising at least three layers of different materials formed by coextrusion process, which comprises: a plastic layer located at middle and having polycarbonate (PC), an upper acrylic layer located above the plastic layer, and a lower acrylic layer located under the plastic layer; an upper hard coating layer is formed above the upper acrylic layer, and a lower hard coating layer is formed below the lower acrylic layer; a coated film layer having a multilayer film structure is further provided on at least the upper hard coating layer of the substrate; the coated film layer comprises: a cohesive layer, a UV-cut layer and a wear-resistant layer; wherein, the material of the cohesive layer includes $SiO_2$; the material of the UV-cut layer includes $Ti_3O_5$; the material of the wear-resistant layer includes $SiO_2$.

In a preferred embodiment, the coated film layer further comprises a IR-cut layer. A top hard coating layer is further furnished on a top of the coated film layer.

In a preferred embodiment, the different materials of different layers of the substrate have different glass transition temperatures (Tg), and the differences between these different glass transition temperatures of different materials are ranged in 30-60; in addition, a ratio of thicknesses of these different layers of the substrate is between 0.0001~0.001; a refractive index difference between the wear-resistant layer and the UV-cut layer is at least 0.3; for light in ultraviolet wavelength range, a ratio of refractive indices of the wear-resistant layer and the UV-cut layer is between 2.35 and 1.38; a thickness difference between the wear-resistant layer and the UV-cut layer is at least 100 nm.

In order to achieve the aforementioned objectives, the invention provides a method for fabricating a light-transmissive plastic plate structure with curved surface, comprising: Step (A): providing a substrate; the substrate at least comprising a light-transmissive plastic material; Step (B): preheating the substrate; the substrate being heated to a first predetermined temperature state by a preheating process; Step (C): pressure-molding the substrate with a mold; by using a spressure-molding process, the substrate being pressure-molded by the mold in a second predetermined temperature state, in order to form a curved surface on the substrate; and Step (D): cutting a contour of the substrate; the contour of the pressure-molded substrate having the curved surface being cut to make a plastic plate with a predetermined contour and shape.

In a preferred embodiment, a flipping and film-tearing process is further included between the Step (A) and Step (B), the substrate is flipped at a 180-degree angle by a flipping mechanism in order to remove protective films attached on upper and lower surfaces of the substrate; in the preheating step of Step (B), the upper and lower surfaces of the substrate are heated by the heating unit, and the first predetermined temperature is between 60° C. and 105° C.

In a preferred embodiment, the pressure-molding step of Step (C) further comprises the following steps: Step (C1): the substrate is positioned between a top mold and a bottom mold; the substrate is separated from the top mold and the bottom mold by a gap; the temperatures of the substrate, the top mold and the bottom mold are adjusted to the second predetermined temperature by a cooling process; the second predetermined temperature is between 40° C. and 60° C.; a predetermined curved surface is provided on each of the surfaces of the top mold and the bottom mold facing the substrate; Step (C2): the top mold is pushed by a pressurizing and shaping unit, such that, the top mold moves downward and compresses the upper surface of the substrate until the upper surface of the substrate is deformed to conform to the predetermined curved surface of the top mold; at this time, there is still a gap between the substrate and the bottom mold and there is no contact between the substrate and the bottom mold; Step (C3): the bottom mold is pushed by the pressurizing and shaping unit in order to move the bottom mold upward and press the lower surface of the substrate, until the lower surface of the substrate is deformed to conform to the predetermined curved surface of the bottom mold; at this moment, the substrate has been tightly pressed by the top mold and the bottom mold.

In a preferred embodiment, the method for fabricating a light-transmissive plastic plate structure with curved surface further comprises the following steps after the Step (D): Step (E): applying primer layer; by using a coating process, a primer layer being applied to an outer rim area of a surface of the plastic plate; Step (E1): applying sealing ring layer; by using a glue dispensing process, at least one sealing ring layer being provided on the primer layer; the sealing ring layer being partially disposed on the surface of the primer layer facing the connecting structure, and the sealing ring layer being sandwiched between contact surfaces of the primer layer and the connecting structure; Step (F): insert-molding injection of connecting structure; through an insert-molding injection process, a connecting structure being formed in an insert-molding injection manner and fixed at the position of the outer rim area of the plastic plate having the primer layer.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The light-transmissive plastic plate structure suitable for vehicle sunroof with curved surface in accordance with the invention and the fabricating method thereof uses the polymer material formulation, UV resistant coating formulation and precision coating technologies to improve the wear resistance of polymer surface of plastic substrate to the same level as glass (Taber Test L level), and the original optical and physical properties after various environmental tests can still be maintained. The plastic substrate is first formed into a curved plastic plate through a hot pressing process, and then a connecting structure is formed and fixed on the plastic plate by an insert-molding injection process, in order to replace the traditional car sunroof mechanism which is assembled by glass plate bonded with metal connecting parts. The light-transmissive plastic plate structure with curved surface comprises a lightweight polymer sunroof and a lightweight plastic connecting structure fixed to the sunroof by insert-molding injection, which can reduce the weight of traditional glass sunroof, front and rear windshield, and side window glass assembly, and is particularly suitable for use in oil-electric hybrid vehicles and pure-electric vehicles that require lightweight specifications.

In order to more clearly describe the structure of the light-transmissive plastic plate structure with curved surface and the manufacturing method thereof, detailed descriptions of various embodiments are provided with reference to the drawings.

Figure 1A:
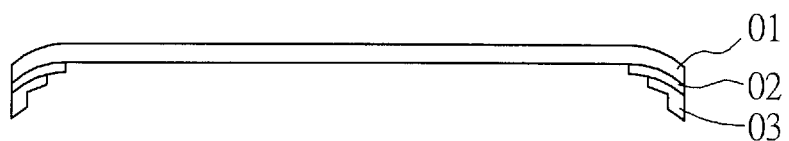
FIG. 1A and FIG. 1B respectively are a schematic sectional view and a bottom view of the connecting structure adhered to the glass plate with curved surface by using adhesive.
Figure 1B:
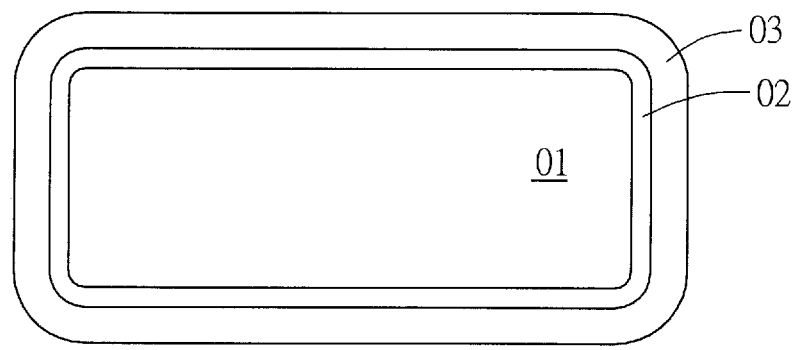
Figure 2:
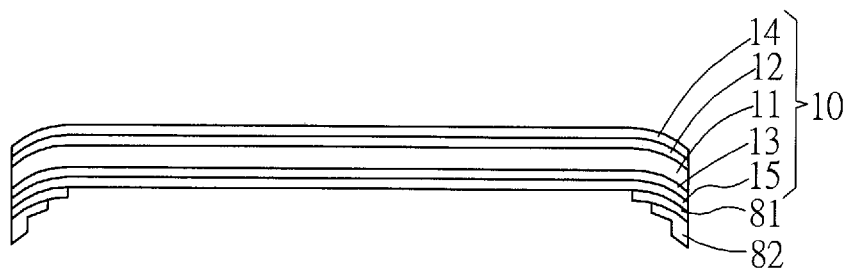
FIG. 2 is a schematic sectional view of the first embodiment of the light-transmissive plastic plate structure with curved surface in accordance with the present invention.

Please refer to FIG. 2, which is a schematic sectional view of the first embodiment of the light-transmissive plastic plate structure with curved surface in accordance with the present invention. In the first embodiment of the invention, the light-transmissive plastic plate structure comprises: a substrate 10, a primer layer 81 and a connecting structure 82.

The substrate 10 at least comprises a transparent hard plastic material and has an outer surface (top surface) and an inner surface (bottom surface) opposite to the outer surface; in addition, the substrate 10 is formed with a curved surface at least at an outer rim area of the inner surface. In this embodiment, the substrate 10 is a multilayer structure comprising at least three layers of different materials formed by coextrusion process, which comprises: a plastic layer 11 located at middle and having polycarbonate (PC), an upper acrylic layer (polymethyl methacrylate, also refers as PMMA) 12 located above the plastic layer 11, and a lower acrylic layer 13 located under the plastic layer 11. An upper hard coating layer (also referred as HC) 14 is formed above the upper acrylic layer 12, and a lower hard coating layer (HC) 15 is formed below the lower acrylic layer 13. The composition of materials of the upper and lower hard coating layers 14, 15 comprises granular dispersed nano-inorganic materials and/or organic-inorganic hybrid UV oligomers or silicone base oligomers, which can provide lightweight polymer plastic substrates with high hardness on the outer and inner surfaces and excellent Taber Test characteristics, maintain high transparency and low haze, and provide a hard and wear-resistant hard protective layer on the outer surface and the inner surface of the substrate 10. In this embodiment, the hard coating layers 14, 15 contain a UV-light elastic oligomer with high glass transition temperature (Tg≥120° C.) or a high Tg monomer (Tg≥240° C.), which can provide polymer plastic material at the adjoining surface with high impact resistance, high flexibility and good stability under high temperature, as well as to improve the reliability when proceeding with the high temperature and high humidity environmental tests. The thickness and shape of the substrate 10 may vary according to different applications; taking the car sunroof as an example, the thickness of the substrate 10 is usually between 3 mm to 12 mm. The thickness of the engineering plastic layer 11 accounts for about 60% to 99.99% of the total thickness of the substrate, while the total thickness of the two acrylic layers 12 and 13 accounts for about 0.01% to 40% of the total thickness of the substrate.

The composition of the hard coating layers 14, 15 of the invention comprises organic-inorganic hybrid UV oligomers. Compared with the conventional hard layer formula with high-crosslink density, the composition of the hard coating layers 14, 15 of the invention has a relatively low crosslink density, which can form a wear-resistant hard coating layer with low shrinkage and good flexibility. The inorganic material contained in the hard coating layers 14, 15 of the invention can provide good physical properties for the surfaces and thus provide the coatings with high hardness and high wear resistance. Moreover, the hard coating layers 14, 15 contain a UV-light elastic oligomer with high glass transition temperature or a high Tg monomer; compared with the conventional hard layer formula with high-crosslink density, the composition of the hard coating layers 14, 15 of the invention has better stability under high temperature. Therefore, it has better thermo-formability during high temperature processes, and the UV-cured composite sunroof material can be bended to any curvature freely.

The primer layer 81 is furnished at an outer rim area of the inner surface of the substrate 10 for improving the bonding strength and adhesion tightness between the substrate 10 and the connecting structure 82. In the present invention, the primer layer 81 comprises one of the following: compounds of Amines and heterocyclic amines, Silane compounds, and Polyurethane (also referred as PU), and is coated on the outer peripheral (rim) area of the inner surface of the substrate 10 by precision wet coating process, and thus can provide good adhesion effect between heterogeneous materials and is beneficial to pass various environmental aging tests. In addition, the primer layer 81 can be mixed with a pigment (such as a black pigment) so that the primer layer 81 can also have the function of forming an ink-printed layer on the inner surface of the substrate 10.

The connecting structure 82 is fixed to the outer peripheral (rim) area of the inner surface of the substrate 10 at a position having the primer layer 81. The connecting structure 82 is for connecting to an external component (such like car body or sunroof actuating mechanism of car, not shown in figures), such that the substrate 10 can be connected to the external component through the connecting structure 82. The connecting structure 82 is made of hard plastic material or metal material. In the first embodiment shown in FIG. 2, the connecting structure 82 is made of metal such like iron, stainless steel, aluminum alloy by casting, forging or stamping processes. The connecting structure 82 is adhered and fixed to the outer peripheral (rim) area of the inner surface of the substrate 10 at a position having the primer layer 81 by using the primer layer 81 as an adhesive.

In the following embodiments of the invention, because the structures and functions of most components are the same or similar with which of the aforementioned first embodiment, thereby, the same of similar components will be given with the same names and numerals of components without repeating their detailed descriptions.

Figure 3:
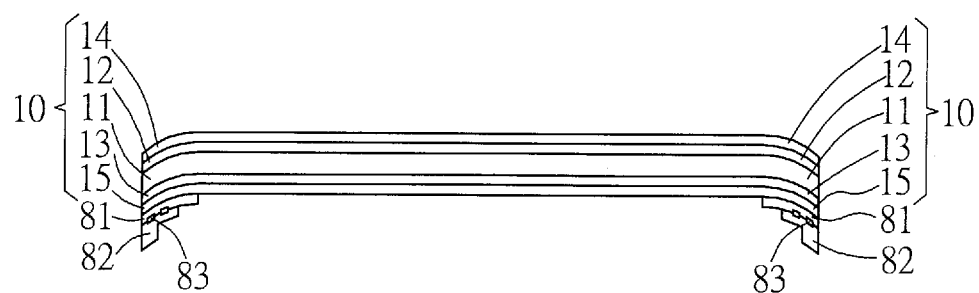
FIG. 3 is a schematic sectional view of the second embodiment of the light-transmissive plastic plate structure with curved surface in accordance with the present invention.

Please refer to FIG. 3, which is a schematic sectional view of the second embodiment of the light-transmissive plastic plate structure with curved surface in accordance with the present invention. In the second embodiment of the invention, the light-transmissive plastic plate structure also comprises: a substrate 10, a primer layer 81 and a connecting structure 82. In addition, the substrate 10 also comprises: a plastic layer 11, an upper acrylic layer (upper PMMA) 12, a lower acrylic layer (lower PMMA) 13, an upper hard coating layer 14 and a lower hard coating layer 15. Because the substrate 10 of the invention is made of hard material with curved surface, and the connecting structure 82 is also made of hard metal; when the curvatures of the joining surfaces of these two components mismatch (curvature tolerance exists), the sealing effect and tightness become poor, and the problem of leaks arises. Therefore, in the second embodiment of the invention shown in FIG. 3, one or more rings of high-temperature-resistant sealing ring layer 83 are partially furnished on the primer layer 81 by dispensing method, which can effectively fill the gaps between two hard materials, and avoid leakage risk of composite sunroof assembly due to curvature tolerance (curvature mismatch). In this embodiment, the sealing ring layer 83 is disposed on a surface of the primer layer 81 facing the connecting structure 82, such that the sealing ring layer 83 is sandwiched between the adjoining surfaces of the primer layer 81 and the connecting structure 82. The one or more rings of sealing ring layer 83 are applied on the surface of the primer layer 81 facing the connecting structure 82 by a dispensing method, and each ring of the sealing ring layer 83 is extending around the outer peripheral (rim) area in a ring shape. The material of the sealing ring layer 83 includes one of the following: silicone and Polyurethane (PU for short), which can fill the gaps caused by curvature tolerance between hard materials in order to improve the sealing effect between the substrate 10 and the connecting structure 82 and is beneficial to pass the leak test.

In addition to the aforementioned connecting structure that is made of metal, the invention further provides a technology for directly molding and fixing the connecting structure onto the plastic plate by using an insert-molding injection process, which can replace the traditional car sunroof mechanism which is assembled by glass plate bonded with metal connecting parts.

Figure 4:
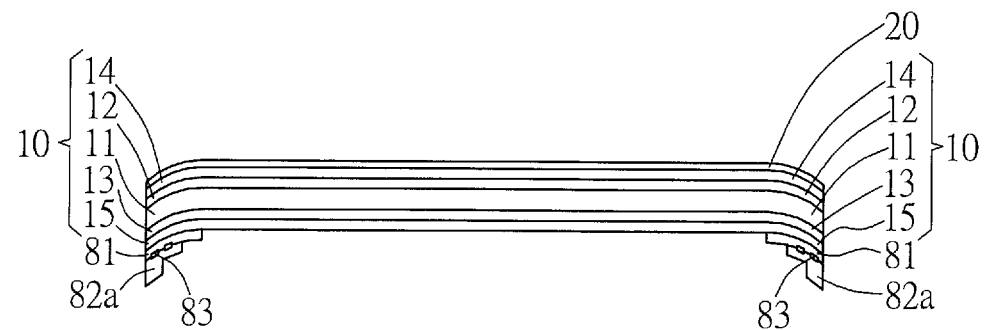
FIG. 4 is a schematic sectional view of the third embodiment of the light-transmissive plastic plate structure with curved surface in accordance with the present invention.

Please refer to FIG. 4, which is a schematic sectional view of the third embodiment of the light-transmissive plastic plate structure with curved surface in accordance with the present invention. In the third embodiment of the invention, the light-transmissive plastic plate structure is similar to the second embodiment and also comprises: a substrate 10, a primer layer 81, a connecting structure 82 and at least one sealing ring layer 83. In addition, the substrate 10 also comprises: a plastic layer 11, upper and lower acrylic layers 12, 13, and upper and lower hard coating layers 14, 15. The differences between the third embodiment and previously illustrated embodiments comprise: the connecting structure 82a is made of a hard plastic material and is molded and fixed on the outer peripheral (rim) area of the inner surface of the substrate 10 having the primer layer 81 by using an insert-molding injection process; wherein the thickness of the connecting structure 82a is between 1 mm to 50 mm. In addition, the hard plastic material of the connecting structure 82a includes at least one of the following: polymethyl methacrylate (also referred as PMMA), Polycarbonate , (also referred as PC), Acrylonitrile Butadiene Styrene (also referred as ABS), Polypyromellitimide (also referred as PMMI), Polyethylene terephthalate (also referred as PET), Polyethylene 2,6-naphthalene dicarboxylate (also referred as PEN), Polyethersulfone (also referred as PES), and Polyimide (also referred as PI). Moreover, in the third embodiment shown in FIG. 4, a coated film layer 20 having a multilayer film structure is further provided on at least the upper hard coating layer 14 of the substrate 10. The coated film layer 20 can provide anti-ultraviolet and abrasion resistance effects to the surface of the substrate 10, and also can improve the shortcomings of the substrate 10 itself, such as poor surface hardness and abrasion resistance, as well as yellowing or degradation due to long-term exposure to heat or ultraviolet. The details of the coated film layer 20 will be described in detail in the subsequent embodiments.

The light-transmissive plastic plate structure with curved surface of the invention provides a solution for lightweight polymer sunroof of cars, which comprises a lightweight polymer sunroof and a lightweight plastic connecting structure fixed to the sunroof by insert-molding injection, and thus can reduce the weight of traditional glass sunroof assembled by glass and metal, and is particularly suitable for use in oil-electric hybrid vehicles and pure-electric vehicles that require lightweight specifications. The lightweight polymer sunroof of the invention comprises primer layer and sealing ring layer sandwiched between the plastic substrate and the plastic connecting structure, especially suitable to be manufactured by using insert-molding injection process to assemble two or more hard and different plastic materials, and has the following advantages:

1. Can reduce the weight of traditional glass sunroof, front and rear windshield, and side window glass assembly, and also has the advantages of light weight (reducing fuel consumption or power consumption) and safety (uneasy to break). The invention uses composite materials such like PMMA/PC/PMMA or PMMA/PC to make the substrate, and uses wet coating and sputtering coating processes to produce the sunroof, the surface hardness can be increased to more than 4H (4H~9H), the wear resistance can pass the Taber Test with level "L", and the UV yellowing resistance test (5000 hours) can maintain the specification of ΔE <1. The manufacturing method of the mechanism of the connecting structure of the present invention is to directly place the composite sunroof into the injection machine, and then using the insert-molding injection process to insert-mold the connecting structure onto the sunroof. Not only the weight can be reduced by replacing the glass with the polymer PC substrate, but also the weight can be further reduced by replacing the iron or stainless steel parts with the polymer connecting structure, and that the effect of reducing the overall weight to ½ to ⅓ of the original weight of the conventional sunroof made of glass and metal parts can be achieved.

2. By using the polymer material formula, coating formula design and precision coating technologies, the abrasion resistance of polymer surfaces can be improved to the same level as glass (abrasion resistance test "Taber Test" can reach "L" level), and the original optical and physical properties can also be maintained after passing various weather resistance tests. The traditional insert-molded polymer materials (connecting structure) and the injection adjoining surface (hard coating of the substrate) cannot be effectively bonded because of their different material properties, and might peel off after environmental tests. In the present invention, a high-temperature-resistant primer layer made of Amine, Silane, or PU-based material is used as the bonding medium between the hard coating layer of substrate and the injected connecting structure, such that, the hard coating layer adjoining the injection surface can has a high surface dyne value (>44 dyne), which is conducive to the bonding of the injected connecting structure; not only can pass the harsh high temperature, high temperature and high humidity, high and low temperatures with cold and hot shock environmental tests, but also can avoid the problems of peeling of the injected polymer connecting structure from the composite sunroof after the environmental tests.

3. By the manufacturing process that the plastic plate is first hot pressed and then insert-molding injected, the conventional design of glass bonded with metal parts can be replaced. In the traditional injection process, the insert-molding polymer materials must reach a high temperature of more than 250 Celsius degrees in the injection screw, and be injected on the hard coating layer of the bonding surface of the composite sunroof; thereby, the composite sunroof has to suffer the high temperature of the injection process. In addition, Because the composite sunroof substrate is a hard plastic material with a curved surface, and the injected polymer connecting structure is also made of hard plastic, when the curvatures of the adjoining surfaces of these two parts do not match (curvature tolerance), it will cause poor sealing between these two parts and thus result in water leakage problems. According to the present invention, one or more rings of high-temperature-resistant sealing ring layer are partially furnished on the primer layer 81 by dispensing method, which can be performed coordinating with the injection process, and can effectively fill the gaps between two hard materials, so as to avoid the risk of leakage of composite sunroof assembly due to curvature tolerance (curvature mismatch).

Figure 5:
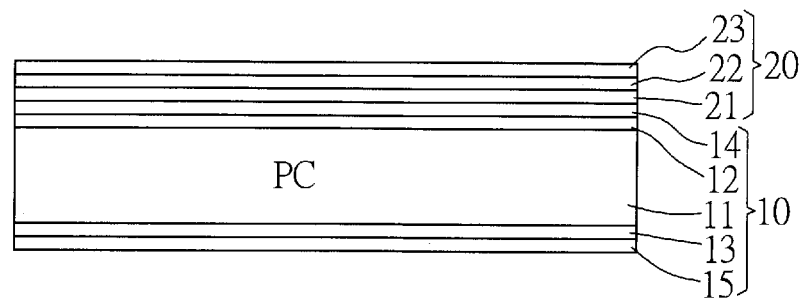
FIG. 5 is a schematic drawing of the first embodiment of the coated film layer furnished on the substrate of the invention.

Please refer to FIG. 5, which is a schematic drawing of the first embodiment of the coated film layer furnished on the substrate of the invention. The substrate 10 shown in FIG. 5 is similar to the third embodiment shown in FIG. 3 and also comprises: a plastic layer 11, upper and lower acrylic layers 12, 13, upper and lower hard coating layers 14, 15, and a coated film layer 20 located above the upper hard coating layer 14. In the present invention, the coated film layer 20 comprises multifunctional optical inorganic materials, which can provide effects of UV resistance, IR resistance and surface abrasion resistance, and can pass L-level Taber Test. Wherein, the multifunctional optical inorganic materials comprise: $SiO_2$, $Ti_3O_5$, $Nb_2O_5$ and/or other materials with low refractive index or high refractive index. As shown in FIG. 5, the first embodiment of the coated film layer 20 comprises: a cohesive layer 21, a UV-cut layer 22 and a wear-resistant layer 23. In this embodiment, the multilayer film structure of the coated film layer 20 can be sequentially formed by a plasma enhanced chemical vapor deposition (also referred as Plasma-Enhanced CVD or PECVD) or vacuum sputtering process on the outer surface of the substrate 10 (that is, the outer surface of the upper hard coating layer 14). In this embodiment, the material of the cohesive layer 21 can be $SiO_2$, the material of the UV-cut layer 22 can be $Ti_3O_5$ added with UV absorber, while the material of the wear-resistant layer 23 can include SiO2.

In a preferred embodiment, the different materials of different layers of the substrate have different glass transition temperatures (Tg), and the differences between these different glass transition temperatures of different materials are ranged in 30-60. In addition, a ratio of thicknesses of these different layers of the substrate is between 0.0001~0.001. The refractive index difference between the wear-resistant layer and the UV-cut layer is at least 0.3. For light in ultraviolet wavelength range, the ratio of the refractive indices of the wear-resistant layer and the UV-cut layer is between 2.35 and 1.38. The thickness difference between the wear-resistant layer and the UV-cut layer is at least 100 nm.

Figure 6:
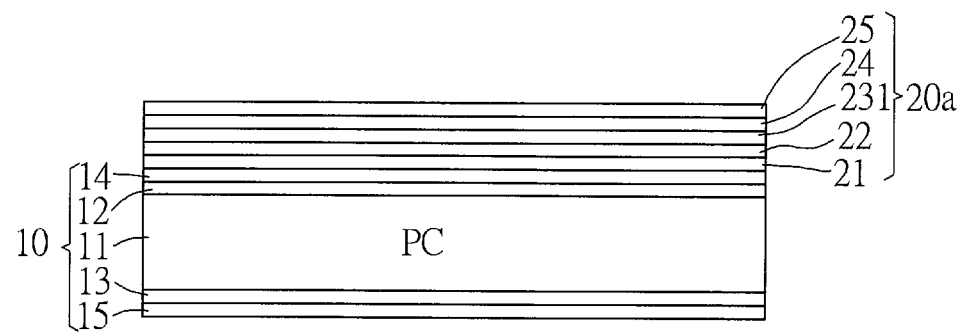
FIG. 6 is a schematic drawing of the second embodiment of the coated film layer furnished on the substrate of the invention.

Please refer to FIG. 6, which is a schematic drawing of the second embodiment of the coated film layer furnished on the substrate of the invention. In FIG. 6, the second embodiment of the coated film layer 20a comprises (from bottom to top sequentially): a first cohesive layer 21, a UV-cut layer 22, a second cohesive layer 231, an IR-cut layer 24 and a wear-resistant layer 25. The material of first and second cohesive layers 21, 231 can include $SiO_2$, the materials of the UV-cut layer 22 and the IR-cut layer 24 can be $Ti_3O_5$ added with UV absorber and IR absorber respectively, while the material of the wear-resistant layer 25 can include $SiO_2$. By providing the anti-ultraviolet (UV-cut) and anti-infrared (IR-cut) functions on the outer surface of the substrate 10 body, not only the UV and IR blocking effects can be provided, but also the substrate itself does not yellow, and it does not accumulate thermal energy as well; the substrate itself retains optically transparent status.

Figure 7:
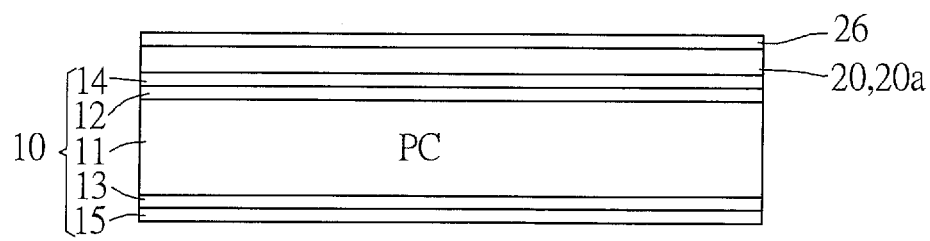
FIG. 7 is a schematic drawing of the third embodiment of the coated film layer furnished on the substrate of the invention.

Please refer to FIG. 7, which is a schematic drawing of the third embodiment of the coated film layer furnished on the substrate of the invention. In FIG. 7, the structure of the coated film layer 20, 20a can be the same as the embodiment illustrated in FIG. 5 or FIG. 6, however, a top hard coating layer 26 can be further furnished on the top of the coated film layer 20, 20a in order to improve the hardness and abrasion resistance ability of the top surface of the coated film layer 20, 20a; in addition, the top surface of the coated film layer 20, 20a is better resistant to strong acid and alkali.

Figure 8:
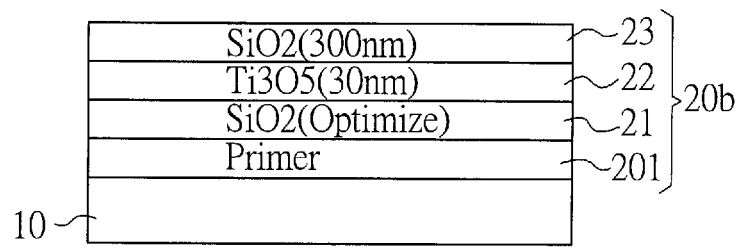
FIG. 8 is a schematic drawing of the fourth embodiment of the coated film layer furnished on the substrate of the invention.

Please refer to FIG. 8, which is a schematic drawing of the fourth embodiment of the coated film layer furnished on the substrate of the invention. In this embodiment, the coated film layer 20b comprises (from bottom to top sequentially): a primer layer 201, a cohesive layer 21, a UV-cut layer 22, and a wear-resistant layer 23. The material of the primer layer 201 is elected from a material that can improve adhesion of the UV-cut layer 22, such like, but not limited to: compounds of amines or heterocyclic amine, and silane compounds including siloxane compound and silazane compound. By employing the primer layer 201 and the cohesive layer 21 containing $SiO_2$, the UV-cut layer 22 can be adhered more tightly on the substrate 10 made of PC or PMMA, so as to solve the shortcoming of poor adhesion between the substrate 10 and both the metal and silicon dioxide materials of conventional technologies.

The UV-cut layer 22 is located above the cohesive layer 21 and is made of $Ti_3O_5$. Titanium pentoxide ($Ti_3O_5$) is one of the optical coating materials produced by advanced vacuum sintering technology, which has the advantages of: not soluble in water, with high refractive index and small resistance, with strong adhesion, not easy to splash, with good optical cleanliness of optical surface after film formation, and with good UV blocking effect. In the present invention, electron gun evaporation method can be used to deposit titanium trioxide ($Ti_3O_5$) on the silicon dioxide ($SiO_2$) cohesive layer 21 above the primer layer 201, in order to form the UV-cut layer 22. In this embodiment, the thickness of the UV-cut layer 22 is between 10 nm to 300 nm.

The wear-resistant layer 23 is located above the UV-cut layer 22 and is made of inorganic silicon dioxide ($SiO_2$). Using the silicon dioxide ($SiO_2$) layer having high hardness and high abrasion resistance characteristics to protect the substrate and the UV-cut layer 22, in order to improve the abrasion resistance of the substrate 10, and to avoid the UV-resistant layer 22 from scratching. In this embodiment, the thickness of the wear-resistant layer 23 is between 60 nm to 600 nm.

In this embodiment, the refractive index difference between the wear-resistant layer 23 and the UV-cut layer 22 is at least 0.3. For light in the ultraviolet wavelength range, the ratio of the refractive indices of the wear-resistant layer 23 and the UV-cut layer 22 is between 2.35 and 1.38. The thickness difference between the wear-resistant layer 23 and the UV-cut layer 22 is at least 100 nm. The superimposing method of the wear-resistant layer 23 and the UV-cut layer 22 is yA:xB:yA; wherein "A" represents the optical thickness of the silicon dioxide ($SiO_2$) layer, "B" represents the optical thickness of the titanium trioxide ($Ti_3O_5$) layer, "x" represents the multiple of the optical thickness "B" of the titanium trioxide layer relative to the optical thickness "A" of the adjacent silicon dioxide layer, and "y" represents the multiple of the optical thickness "A" of the silicon dioxide layer relative to the optical thickness "B" of the adjacent titanium trioxide layer; wherein, "x" and "y" are not equal and proportional to each other, and the ratio of "x" to "y" is between a predetermined range.

Figure 9:
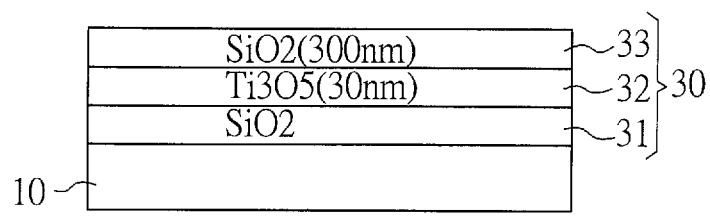
FIG. 9 is a schematic drawing of the fifth embodiment of the coated film layer furnished on the substrate of the invention.

Please refer to FIG. 9, which is a schematic drawing of the fifth embodiment of the coated film layer furnished on the substrate of the invention. In this embodiment, the coated film layer 30 also comprises: a cohesive layer 31, a UV-cut layer 32, and a wear-resistant layer 33. The cohesive layer 31 includes silicon dioxide ($SiO_2$) material and has a thickness between 10 nm and 300 nm. The UV-cut layer 32 is made of titanium trioxide ($Ti_3O_5$), and the thickness is between 10 nm and 300 nm. The cohesive layer 31 containing silicon dioxide material can improve the adhesion between the UV-cut layer 32 made of titanium pentoxide and the substrate 10 made of PC. The wear-resistant layer 33 is located on the UV-cut layer 32. The material of the wear-resistant layer 33 is inorganic silicon dioxide ($SiO_2$) and the thickness thereof is between 60 nm and 600 nm.

Figure 10:
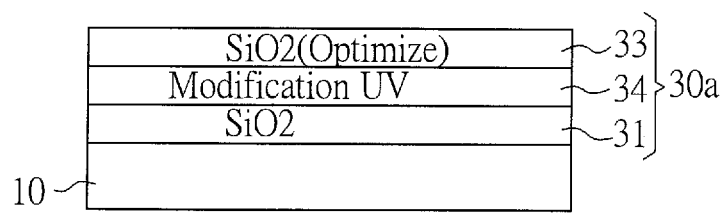
FIG. 10 is a schematic drawing of the sixth embodiment of the coated film layer furnished on the substrate of the invention.

Please refer to FIG. 10, which is a schematic drawing of the sixth embodiment of the coated film layer furnished on the substrate of the invention. In this embodiment, the coated film layer 30a also comprises: a cohesive layer 31, a UV-cut layer 34, and a wear-resistant layer 33. The UV-Cut layer 34 is a UV-Cut multilayer film structure composed of one or more anti-ultraviolet materials (such as, but not limited to: H: $Ti_3O_5$ & L: $SiO_2$ S/(0.5HL0.5H)15/Air). The cohesive layer 31 containing silicon dioxide material can improve the adhesion between the UV-cut layer 34 made of UV-Cut multilayer film structure and the substrate 10 made of PC.

Figure 11:
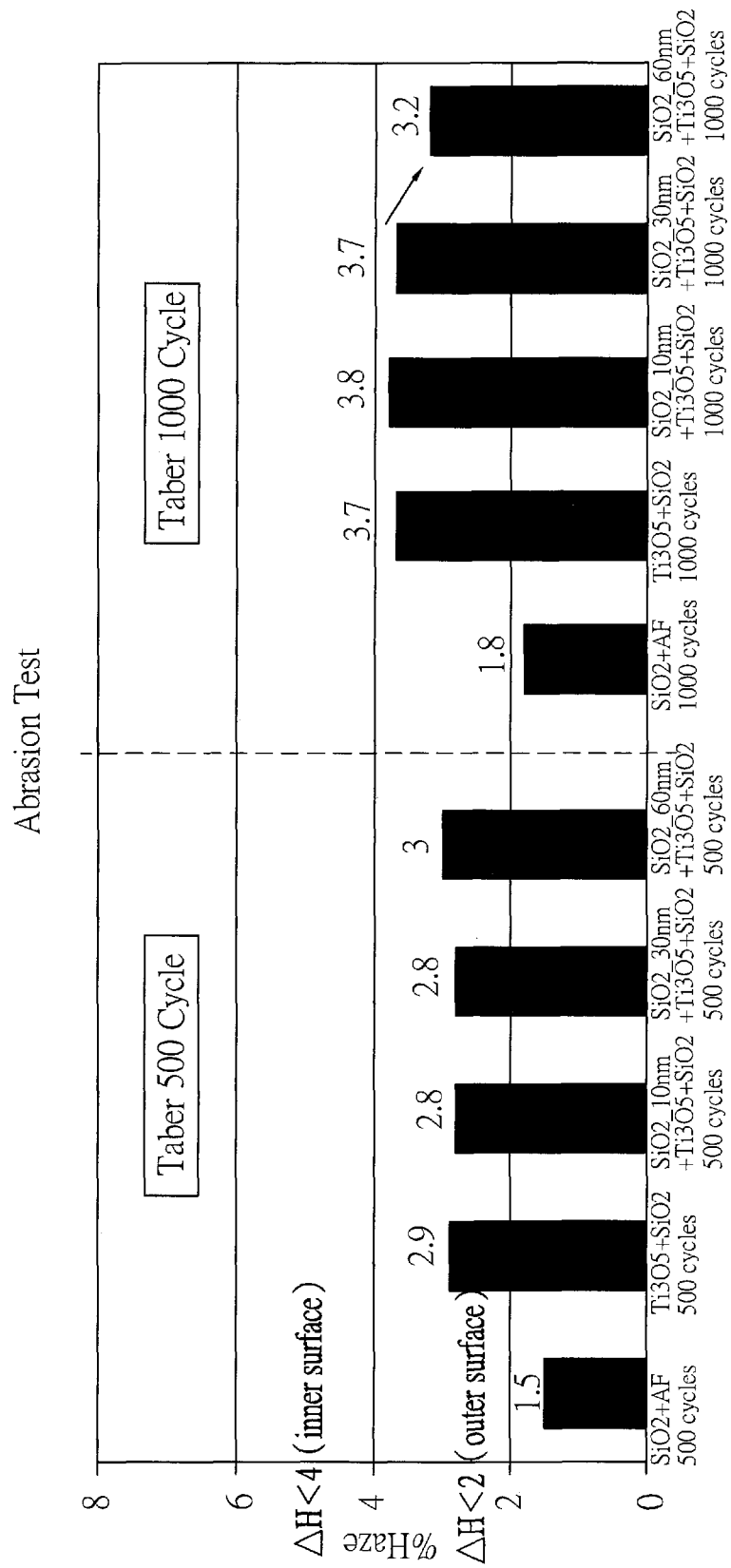
FIG. 11 is a schematic diagram showing the abrasion testing results of some embodiments of light-transmissive substrate having the coated film layer of the invention.

Please refer to FIG. 11, which is a schematic diagram showing the abrasion testing results of some embodiments of light-transmissive substrate having the coated film layer of the invention. The abrasion test mentioned in the present invention is conducted by using a Taber Abraser (abrasion testing machine) commonly used in the industry, which uses a flat sample plate with a length and width of 100 mm×100 mm for testing. The Taber Abraser is epuipped with a horizontal rotary table with a rotation speed of 55 rpm to 7 rpm for supporting the sample plate and a pair of wear wheels fixed at (65±3) mm intervals and capable of rotating smoothly; wherein each wear wheel has a diameter of 45 mm-~50 mm, a thickness of around 1.5 mm, and is made of rubber mixed with abrasive materials of hardness (75+5) IRHD. Under a load of 4.9N (Newton force), the wear wheels contact the upper surface of the testing sample plate and perform abrasion test under rotary frictions. The invention uses five sample plates in the abrasion test, including: Sample 1 ($SiO_2$+AF), Sample 2 ($Ti_3O_5$+$SiO_2$), Sample 3 (bottom layer $SiO_2$_10 nm+$Ti_3O_5$+$SiO_2$), Sample 4 (bottom layer $SiO_2$_30 nm+$Ti_3O_5$+$SiO_2$), and Sample 5 (bottom layer $SiO_2$_60 nm+$Ti_3O_5$+$SiO_2$). It can be seen from FIG. 11 that, after the Taber Abraser performs 500 cycles of rotary abrasions, the degrees of abrasions of the Samples 2 to 5 are similar, which are around $\Delta H$ 2.8; however, after 1000 cycles of rotary abrasions, the degree of abrasion of Sample 5 having a bottom layer of 60 nm in thickness is $\Delta H$ 3.2, which is much lower than the degree of abrasion $\Delta H$ 3.7 of Sample 4 having a bottom layer of 30 nm in thickness. This test result reveals that, according to the structure of coated film layer of the present invention, relatively good wear-resistant performance can be achieved when the thickness of the bottom layer SiO2 (ie, the cohesive layer) is 60 nm.

Figure 12:
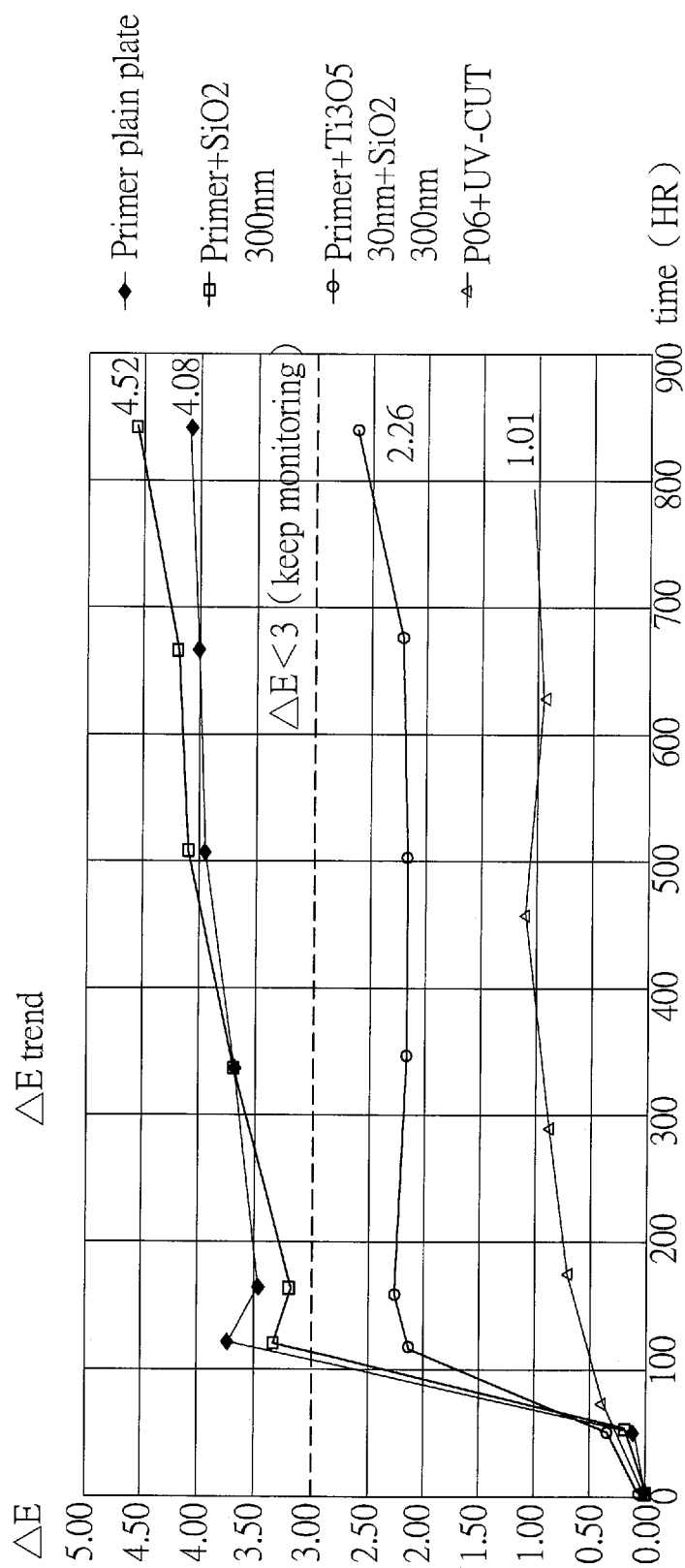
FIG. 12 is a schematic diagram showing the ultraviolet resistance (UV-cut) testing results of some embodiments of light-transmissive substrate having the coated film layer of the invention.

Please refer to FIG. 12, which is a schematic diagram showing the ultraviolet resistance (UV-cut) testing results of some embodiments of light-transmissive substrate having the coated film layer of the invention. The ultraviolet resistance test performed in the present invention is to irradiate several different testing sample plates for a long time with an ultraviolet light source, and testing and recording the degree of yellowing of each sample plate after different exposure times (expressed in terms of $\Delta E$ value, the higher the $\Delta E$ value, the more severe the yellowing degree, that is, the worse the UV-cut performance), and then plotting the diagram as FIG. 12. The invention uses four sample plates, including: Sample 1 (Primer plain plate), Sample 2 (Primer+$SiO_2$_300 nm), Sample 3 (Primer+$Ti_3O_5$_30 nm+$SiO_2$_300 nm), and Sample 4 (PC substrate with specification P06+UV-Cut multilayer coated film), to perform the ultraviolet resistance test. It can be seen from FIG. 12 that, The Sample 4 is furnished with the UV-Cut multilayer coated film to act as the coated film layer of the light-transmissive substrate for providing the UV-cut function and thus has relatively the best UV resistance effect in comparison with other sample plates. However, the wear-resistant ability of Sample 4 is reduced. In addition, no matter it is Sample 4 or Sample 3, the $\Delta E$ value is still much lower than 3 even after 800 hours of ultraviolet light irradiation, which shows both Sample 4 and Sample 3 have good UV resistance ability. In contrast, Sample 1 and Sample 2 both lack a UV-resistant layer, so after 100 hours of testing, their $\Delta E$ values are already higher than 3; yellowing is relatively severe.

The present invention also uses the industry test specification PV3929 for weatherability testing, the purpose of testing is that: plastic, synthetic rubber, and canopy materials are exposed to the atmosphere and sunlight, and are tested on aging conditions (such as changes in color and gloss) through artificial dry, hot climates (such as the dry and hot environments of the Grahari Desert, South Africa, and Arizona); the testing conditions arc listed in Table 1 below:

TABLE 1

Testing conditions for PV3929 test specification

| Items & condition | Sample size (mm) | Quantity (pcs) | Temp/ Humid | Testing Tool | Measure Tool | Testing condition | Result |
|---|---|---|---|---|---|---|---|
| Weatherability Hot and dry climate PV3929 | 145 × 4 | 3 | Black Standard Temp 90 ± 2° C. 50 ± 2° C./ 20 ± 10% | DIN EN ISO 4892-2 Arc Xenon Lamp | Visual Gloss meter Color meter | Radiation intensity 0.6 W/m$_2$ (340 nm) Duration 1500 hrs | Appearance (cracks, spots, oozing, white fog) Gloss determine DIN 67530 Colorimetry CIElab (DIN 6174) |

The invention uses five sample plates based on the testing conditions shown in Table 1, including: Sample 1 (Plain plate PC_Smoke_3L), Sample 2 (HC PC_P06 substrate), Sample 3 (Evaporation PC_P06 substrate+$SiO_2$_60 nm), Sample 4 (Evaporation PC_P06 substrate+$SiO_2$_300 nm), Sample 5 (Evaporation PC_P06 substrate+$Ti_3O_5$+$SiO_2$), to perform the weatherability test, the testing results are listed in Table 2 below.

TABLE 2

Results of Q-Sun simulated PV3929 weatherability test

| Items Tested | Optical Measurement L*a*b (before test) | Optical Measurement L*a*b (after test) | Q-Sun After 1620 hrs ΔE < 3 | Visible light transmittance Before test TT(%) | Visible light transmittance After test TT(%) | Change of Visible light transmitance ≥95% of original value | Change of Appearance Discoloration, blistering, peeling, haze, and loss of gloss |
|---|---|---|---|---|---|---|---|
| Plain plate PC_Smoke_3L | 52.2/ −3.55/ −4.47 | 55.57/ −3.46/ −1.41 | 3.18 (1424 hrs) | 19.77 | 19.56 | 98.9% | na |
| HC PC_P06 | 52/ −3.68/ −4.13 | 54.97/ −3.49/ −1.55 | 2.81 (1424 hrs) | 19.37 | 19.07 | 98.5% | na |
| Evaporation P06 + $SiO_2$_60 nm | 52.19/ −3.77/ −4.16 | 54.66/ −3.54/ −2.15 | 2.32 (1424 hrs) | 19.28 | 19.12 | 99.2% | na |
| Evaporation P06 + $SiO_2$_300 nm | 52.12/ −4.27/ −3.99 | 54.77/ −4.06/ −1.83 | 2.5 (1424 hrs) | 19.32 | 19.03 | 98.5% | na |
| Evaporation $Ti_3O_5$ + $SiO_2$ | 49.83/ −12.01/ 1.56 | 51.26/ −11.86/ 2.82 | 1.21 (888 hrs) | 17.56 | 17.18 | 97.8% | na |

It can be seen from the above Table 2 that, when the light-transmissive substrate is furnished with both the UV-cut layer ($Ti_3O_5$ layer) and wear-resistant layer ($SiO_2$ layer), i.e., Sample 5 (Evaporatin $Ti_3O_5$+$SiO_2$), the weatherability testing result is better than other Samples 1-4 without UV-cut layer.

The present invention is also tested for a variety of different structures of composite sunroof and plastic mechanism assembly, such like the structural information of each sample tested is shown in Table 3 below. For example, the substrate of Sample 8 in Table 3 uses the "A4" structure which is the "PMMA/PC/PMMA" three-layer plate structure; the hard coating layer uses "B2" which means "with hard coating layer (with HC)"; the material of connecting structure uses "C2" which means "plastic"; the primer layer uses "D1" which means "without primer layer"; the sealing ring layer uses "E1" which means "without sealing ring layer". The structures of other Samples (e.g., Samples 1-7 and 9-14 and Comparative Sample) can also be realized by the same way, and thus are not repeatedly described.

TABLE 3

Sample information of composite sunroof and plastic mechanism assembly

| Sample No. | A: selection of polymer material A1: PC A2: PMMA A3: PMMA/PC A4: PMMA/ PC/PMMA | B: with or without HC B1: Without HC B2: With HC | C: material of connecting structure C1: metal C2: plastic | D: with or without Primer D1: Without Primer D2: With Primer | E: with or without Sealing Layer E1: Without Sealing Layer E2: With Sealing Layer | Remark |
|---|---|---|---|---|---|---|
| Sample1 | A1 | B2 | C1 | — | — | Easy yellowing, poor weatherability |
| Sample2 | A2 | B2 | C1 | — | — | Fragile, poor strength |

TABLE 3-continued

Sample information of composite sunroof and plastic mechanism assembly

| Sample No. | A: selection of polymer material<br>A1: PC<br>A2: PMMA<br>A3: PMMA/PC<br>A4: PMMA/PC/PMMA | B: with or without HC<br>B1: Without<br>B2: With HC | C: material of connecting structure<br>C1: metal<br>C2: plastic | D: with or without Primer<br>D1: Without<br>D2: With Primer | E: with or without Sealing Layer<br>E1: Without<br>E2: With Sealing Layer | Remark |
|---|---|---|---|---|---|---|
| Sample3 | A3 | B2 | C1 | — | — | OK, weight reduced for 1/4~1/3 |
| Sample4 | A4 | B2 | C1 | — | — | OK, weight reduced for 1/4~1/3 |
| Sample5 | A3 | B1 | C1 | — | — | Insufficient hardness, poor scratch resistance |
| Sample6 | A4 | B1 | C1 | — | — | Insufficient hardness, poor scratch resistance |
| Sample7 | A3 | B2 | C2 | D1 | E1 | Poor adhesion between injected HC/plastic |
| Sample8 | A4 | B2 | C2 | D1 | E1 | Poor adhesion between injected HC/plastic |
| Sample9 | A3 | B2 | C2 | D1 | E2 | Poor adhesion between injected HC/plastic |
| Sample10 | A4 | B2 | C2 | D1 | E2 | Poor adhesion between injected HC/plastic |
| Sample11 | A3 | B2 | C2 | D2 | E1 | adhesion OK, leakage NG |
| Sample12 | A4 | B2 | C2 | D2 | E1 | adhesion OK, leakage NG |
| Sample13 | A3 | B2 | C2 | D2 | E2 | adhesion OK, leakage OK |
| Sample14 | A4 | B2 | C2 | D2 | E2 | OK, weight reduced for 1/2~2/3 |
| Comparative Sample | Glass | — | C1 | — | — | heavy |

TABLE 4

Test results of samples of composite sunroof and plastic mechanism assembly

| Sample No. | Pencil hardness/ 750 g | Wear-resistance of surface | Impact resistance with falling ball (cm)/ 375 g | UVB weather-ability | Ink adhesion | Plastic adhesion Primer layer | Leakage test Sealing ring layer |
|---|---|---|---|---|---|---|---|
| Sample1 | HB | △ | ⊚ | X | 5B | — | OK |
| Sample2 | ≥4H | ⊚ | X | ⊚ | 5B | — | OK |
| Sample3 | ≥4H | ⊚ | ⊚ | ⊚ | 5B | — | OK |
| Sample4 | ≥4H | ⊚ | ○ | ⊚ | 5B | — | OK |
| Sample5 | H | X | ⊚ | ○ | 3B | — | OK |
| Sample6 | H | X | ○ | ○ | 0B | — | OK |
| Sample7 | ≥4H | ⊚ | ⊚ | ⊚ | 5B | NG | NG |
| Sample8 | ≥4H | ⊚ | ○ | ⊚ | 5B | NG | NG |
| Sample9 | ≥4H | ⊚ | ⊚ | ⊚ | 5B | NG | NG |
| Sample10 | ≥4H | ⊚ | ○ | ⊚ | 5B | NG | NG |
| Sample11 | ≥4H | ⊚ | ⊚ | ⊚ | 5B | OK | NG |
| Sample12 | ≥4H | ⊚ | ○ | ⊚ | 5B | OK | NG |
| Sample13 | ≥4H | ⊚ | ⊚ | ⊚ | 5B | OK | OK |
| Sample14 | ≥4H | ⊚ | ○ | ⊚ | 5B | OK | OK |
| Comparative Sample | ≥7H | ⊚ | X | ⊚ | 5B | — | OK |

| Sample No. | Weight reduced | UV-cut effect | IR-cut effect | Hail shock test | Vehicle roll test | QUV weather-ability test 5000 hrs (ΔE) | weather-ability test 105° C. 5000 hrs |
|---|---|---|---|---|---|---|---|
| Sample1 | ○ 1/4~1/3 | X | ⊚ | ⊚ | ⊚ | >10 | ⊚ |
| Sample2 | ○ 1/4~1/3 | ⊚ | X | X | X | <1 | X |
| Sample3 | ○ 1/4~1/3 | ⊚ | ⊚ | ⊚ | ⊚ | <2 | ⊚ |
| Sample4 | ○ 1/4~1/3 | ⊚ | ⊚ | ○ | ○ | <2 | ⊚ |
| Sample5 | ○ 1/4~1/3 | ○ | ⊚ | ⊚ | ⊚ | <3 | ⊚ |
| Sample6 | ○ 1/4~1/3 | ○ | ⊚ | ○ | ○ | <3 | ⊚ |
| Sample7 | ⊚ 1/2~2/3 | ⊚ | ⊚ | ⊚ | ⊚ | <2 | ⊚ |
| Sample8 | ⊚ 1/2~2/3 | ⊚ | ⊚ | ○ | ○ | <2 | ⊚ |
| Sample9 | ⊚ 1/2~2/3 | ⊚ | ⊚ | ⊚ | ⊚ | <2 | ⊚ |
| Sample10 | ⊚ 1/2~2/3 | ⊚ | ⊚ | ○ | ○ | <2 | ⊚ |
| Sample11 | ⊚ 1/2~2/3 | ⊚ | ⊚ | ⊚ | ⊚ | <2 | ⊚ |
| Sample12 | ⊚ 1/2~2/3 | ⊚ | ⊚ | ○ | ○ | <2 | ⊚ |
| Sample13 | ⊚ 1/2~2/3 | ⊚ | ⊚ | ⊚ | ⊚ | <2 | ⊚ |
| Sample14 | ⊚ 1/2~2/3 | ⊚ | ⊚ | ○ | ○ | <2 | ⊚ |
| Comparative Sample | X | X | X | X | X | <1 | ⊚ |

⊚: Excellent
○: Good
△: Normal
X: Fail
NG: Not Good

It can be seen from the above Table 4 that, because both the Sample 13 and Sample 14 use multilayer structures such like PC/PMMA or PMMAIPC/PMMA to be the substrate, and both are furnished with hard coating layer, primer layer and sealing ring layer, and both are bonded with connecting structure by using the insert-molding injection, which is similar to the embodiment shown in FIG. 4, and therefore the testing results of both Sample 13 and Sample 14 are mostly excellent or good. In the other hand, Sample 3 and Sample 4 also use multilayer structures such like PC/PMMA or PMMA/PC/PMMA to be the substrate, and are furnished with hard coating layer, but without primer layer nor sealing ring layer, and are glued with connecting structure by using adhesive, which is similar to the embodiment shown in FIG. 2, the testing results thereof can also achieve the levels of good or excellent. Therefore, it can be proved that the light-transmissive plastic plate structure with curved surface of the present invention can indeed obtain better testing results than the conventional technology.

Furthermore, the present invention also uses a variety of different structures of plastic substrate, such like the structural information of each sample tested is shown in Table 5 below, to perform various environmental tests. For example, the substrate of Sample 8 in Table 5 uses the "A4" structure which is the "PMMA/PC/PMMA" three-layer plate structure; the hard coating layer uses "B2" which means "with hard coating layer (with HC)"; the multifunctional optical inorganic layer (i.e., coated file layer) uses either "C1" or "C2" which means either "single UV reflection layer" or "single IR reflection layer"; the top hard coating layer uses "D1" means "without hard coating layer (without HC)". The structures of other Samples (e.g., Samples 1-7 and 9-14 and Comparative Sample) can also be realized by the same way, and thus are not repeatedly described.

TABLE 5

Sample information of plastic substrate for composite sunroof

| Sample No | A: selection of polymer material<br>A1: PC<br>A2: PMMA<br>A3: PMMA/PC<br>A4: PMMA/PC/PMMA | B: with or without HC<br>B1: Without<br>B2: With HC | C: multifunctional optical inorganic layer<br>C1: UV reflection<br>C2: IR reflection<br>C3: UV + IR reflection | D: with or without top HC<br>D1: Without<br>D2: With Top HC | Remark |
|---|---|---|---|---|---|
| Sample1 | A1 | B2 | — | — | Easy yellowing, poor weatherability |
| Sample2 | A2 | B2 | — | — | Fragile, poor strength |
| Sample3 | A3 | B2 | — | — | Without optical functions |
| Sample4 | A4 | B2 | — | — | Without optical functions |
| Sample5 | A3 | B1 | C1 or C2 | — | Insufficient hardness, poor scratch resistance, Poor adhesion |
| Sample6 | A4 | B1 | C1 or C2 | — | Insufficient hardness, poor scratch resistance, Poor adhesion |
| Sample7 | A3 | B2 | C1 or C2 | D1 | Hardness, optical function and adhesion OK, poor alkali resistance |
| Sample8 | A4 | B2 | C1 or C2 | D1 | |
| Sample9 | A3 | B2 | C1 or C2 | D2 | OK |
| Sample10 | A4 | B2 | C1 or C2 | D2 | OK |
| Sample11 | A3 | B2 | C1 | D2 | OK, with UV Reflection effect |
| Sample12 | A3 | B2 | C2 | D2 | OK, with IR Reflection effect |
| Sample13 | A3 | B2 | C3 | D2 | OK, with UV & IR Reflection effects |
| Sample14 | A4 | B2 | C3 | D2 | OK, with UV & IR Reflection effects |
| Comparative Sample | Glass | — | — | — | Heavy, without optical function |

TABLE 6

Test results of samples of plastic substrate for composite sunroof

| Sample No. | Pencil hardness/ 750 g | Wear-resistance of surface | Impact resistance with falling ball (cm)/ 375 g | UVB weather-ability | Ink adhesion | Weight reduction effect | UV-cut effect |
|---|---|---|---|---|---|---|---|
| Sample1 | HB | △ | ◎ | X | 5B | 1/2 of glass | X |
| Sample2 | ≥4H | ◎ | X | ◎ | 5B | 1/2 of glass | ◎ |
| Sample3 | ≥4H | ◎ | ◎ | ◎ | 5B | 1/2 of glass | ◎ |
| Sample4 | ≥4H | ◎ | ○ | ◎ | 5B | 1/2 of glass | ◎ |
| Sample5 | H | X | ◎ | ○ | 3B | 1/2 of glass | ◎ |
| Sample6 | H | X | ○ | ○ | 0B | 1/2 of glass | ◎ |
| Sample7 | ≥4H | ◎ | ◎ | ◎ | 5B | 1/2 of glass | ◎ |
| Sample8 | ≥4H | ◎ | ○ | ◎ | 5B | 1/2 of glass | ◎ |
| Sample9 | ≥4H | ◎ | ◎ | ◎ | 5B | 1/2 of glass | ◎ |
| Sample10 | ≥4H | ◎ | ○ | ◎ | 5B | 1/2 of glass | ◎ |
| Sample11 | ≥4H | ◎ | ◎ | ◎ | 5B | 1/2 of glass | ◎ |
| Sample12 | ≥4H | ◎ | ○ | ◎ | 5B | 1/2 of glass | ◎ |
| Sample13 | ≥4H | ◎ | ◎ | ◎ | 5B | 1/2 of glass | ◎ |
| Sample14 | ≥4H | ◎ | ○ | ◎ | 5B | 1/2 of glass | ◎ |
| Comparative Sample | ≥7H | ◎ | X | ◎ | 5B | X | X |

| Sample No. | IR-cut thermal insulation effect | SHGC | deteriorate UV radiation | deteriorate in high temperature | Multi-functional optical layer adhesion | Surface alkali resistance effect | QUV weather-ability test 5000 hrs (ΔE) | Weather-ability test 105° C. 5000 hrs |
|---|---|---|---|---|---|---|---|---|
| Sample1 | ◎ | 0.54 | NG | NG | — | OK | >10 | ◎ |
| Sample2 | X | 0.85 | NG | NG | — | OK | <1 | X |
| Sample3 | ◎ | 0.55 | NG | NG | — | OK | <2 | ◎ |
| Sample4 | ◎ | 0.56 | NG | NG | — | OK | <2 | ◎ |
| Sample5 | ◎ | 0.19 | ◎ | ◎ | 5B | NG | <1 | ◎ |
| Sample6 | ◎ | 0.21 | ◎ | ◎ | 5B | NG | <1 | ◎ |
| Sample7 | ◎ | 0.20 | ◎ | ◎ | 5B | NG | <1 | ◎ |
| Sample8 | ◎ | 0.21 | ◎ | ◎ | 5B | NG | <1 | ◎ |
| Sample9 | ◎ | 0.20 | ◎ | ◎ | 5B | OK | <1 | ◎ |
| Sample10 | ◎ | 0.21 | ◎ | ◎ | 5B | OK | <1 | ◎ |
| Sample11 | ◎ | 0.20 | ◎ | ◎ | 5B | OK | <1 | ◎ |
| Sample12 | ◎ | 0.20 | ◎ | ◎ | 5B | OK | <1 | ◎ |
| Sample13 | ◎ | 0.20 | ◎ | ◎ | 5B | OK | <1 | ◎ |
| Sample14 | ◎ | 0.21 | ◎ | ◎ | 5B | OK | <1 | ◎ |
| Comparative Sample | X | 0.84 | X | X | — | NG | <1 | ◎ |

◎: Excellent
○: Good
△: Normal
X: Fail
NG: Not Good

It can be seen from the above Table 6 that, because the Samples 9-14 all use multilayer structures such like PC/PMMA or PMMA/PC/PMMA to be the substrate, and are all furnished with hard coating layer, coated film layer and top hard coating layer, which are similar to the embodiment of substrate shown in FIG. 7, and therefore the testing results of these Samples 9-14 are mostly excellent or good. In the other hand, Sample 7 and Sample 8 also use multilayer structures such like PC/PMMA or PMMA/PC/PMMA to be the substrate, and are furnished with hard coating layer and coated film layer, but without top hard coating layer, which is similar to the embodiments shown in FIGS. 4 to 6, the testing results thereof can also achieve the levels of good or excellent. Therefore, it can be proved that the substrate structure with coated film layer of the present invention can indeed obtain better testing results than the conventional technology.

Figure 13:
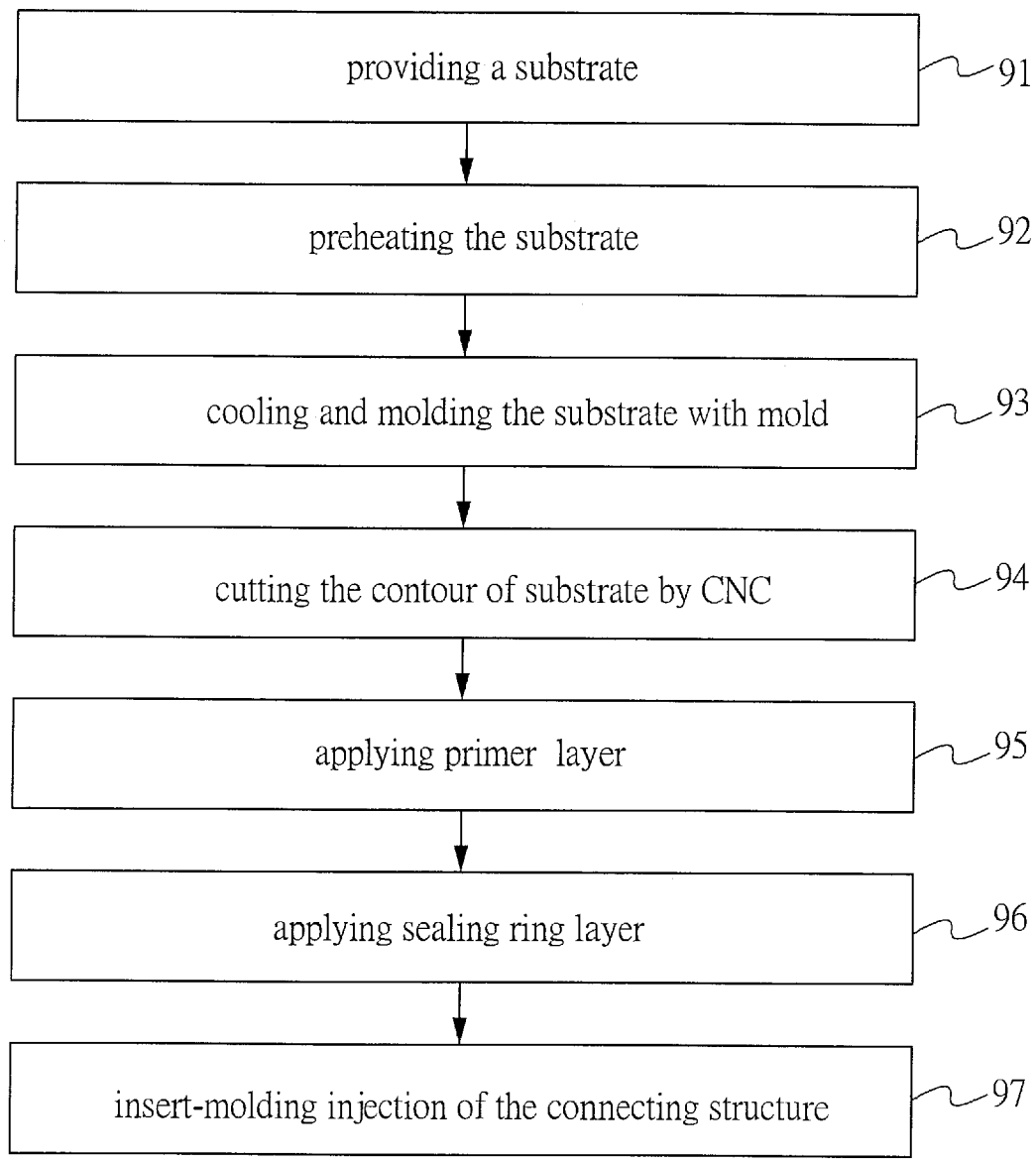
FIG. 13 is a flowchart showing a manufacturing method of a light-transmissive plastic plate structure with a curved surface according to the present invention.

Please refer to FIG. 13, which is a flowchart showing a manufacturing method of a light-transmissive plastic plate structure with a curved surface according to the present invention, comprising the following steps.

Step 91: providing a substrate. The substrate at least comprises a plastic material with multilayer structure. In this embodiment, the substrate can be the substrate with coated film layer shown in FIG. 4, in which, the detailed and specific structure of the substrate and the coated film layer can be selected from any of the substrates and the coated film layers shown in FIGS. 5 to 10.

Step 92: preheating the substrate. The substrate is heated to a first predetermined temperature by a preheating process.

Step 93: cooling and pressure-molding the substrate with mold. By using a stamping process and a cooling process, the substrate is first cooled down to a second predetermined temperature, and then the substrate is pressure-molded by a mold at the same time.

Step 94: cutting the contour of substrate by CNC. The contour of the pressure-molded substrate is cut by a CNC (Computer Numerical Control) milling machine to make a plastic plate with a predetermined contour and shape.

Step 95: applying primer layer. By using a coating process, a primer layer is applied to an outer peripheral (rim) area of the surface of the plastic plate.

Step 96: applying sealing ring layer. By using a glue dispensing process, at least one sealing ring layer is provided on the primer layer. The sealing ring layer is partially disposed on the surface of the primer layer facing the connecting structure, and the sealing ring layer is sandwiched between the contact surfaces of the primer layer and the connecting structure.

Step 97: insert-molding injection of the connecting structure. Through an insert-molding injection process, a connecting structure is formed in an insert-molding injection manner and fixed at the position of the outer peripheral (rim) area of the plastic plate having the primer layer. The assembly of the light-transmissive plastic plate structure with a curved surface and the connecting structure as shown in FIG. 4 can be manufactured through the above Steps 91-97.

Figure 14:
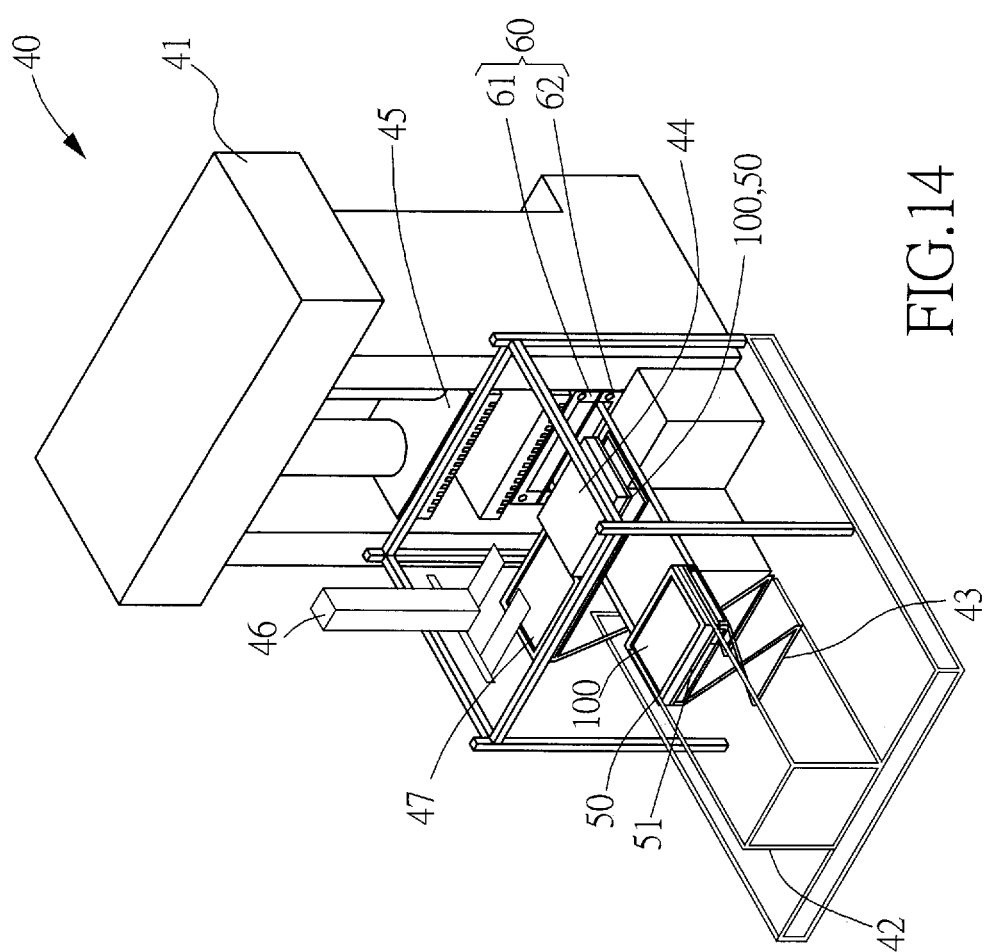
FIG. 14 is a schematic diagram of an embodiment of a molding press machine applicable to the manufacturing method of the light-transmissive plastic plate structure with a curved surface according to the present invention.

Please refer to FIG. 14, which is a schematic diagram of an embodiment of a molding press machine applicable to the manufacturing method of the light-transmissive plastic plate structure with a curved surface according to the present invention. The molding press machine 40 comprises a machine body 41, a flipping and film-tearing unit 42, a conveyor 43, a heating unit 44, a pressurizing and shaping unit 45, a moving-arm mechanism 46 and discharging unit 47.

Figure 15:
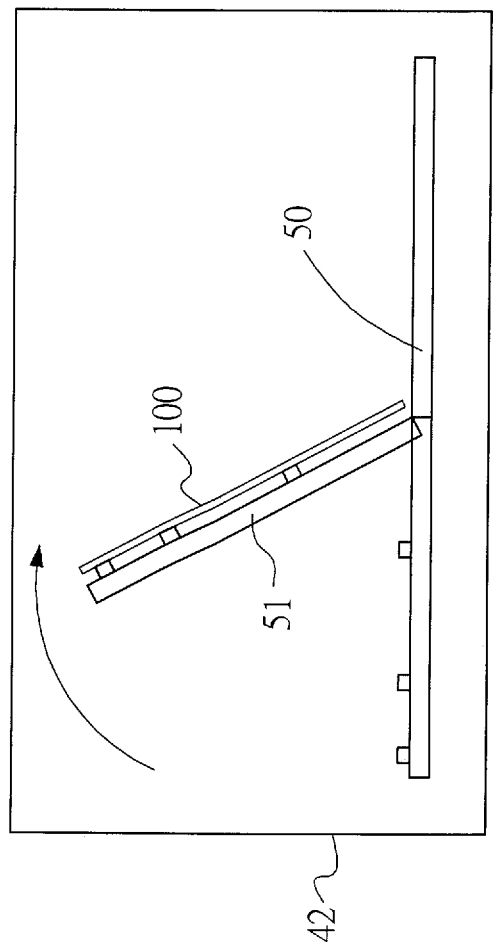
FIG. 15 is a schematic diagram of the flipping mechanism of the flipping and film-tearing unit shown in FIG. 14.

The machine body 41 is the body for supporting all other units, mechanisms and components of the molding press machine 40. The flipping and film-tearing unit 42 includes a flipping mechanism (as shown in FIG. 15). Firstly, the substrate 100 to be processed is placed in a feed rack 50, and then, the feed rack 50 together with the substrate 100 is transported into the flipping and film-tearing unit 42, in order to perform a flipping and film-tearing process which is processed between the Step 91 and Step 92 of FIG. 13. The flippable frame 51 and the substrate 100 are flipped at a 180-degree angle by the flipping mechanism in the flipping and film-tearing unit 42 in order to remove (tear off) the protective films attached on the upper and lower surfaces of the substrate 100. Then, the feed rack 50 together with the torn-off substrate 100 is transported into the heating unit 44 by a conveyor 43 for performing the preheating procedure of Step 92 shown in FIG. 13 in order to preheat the substrate 100 to the first predetermined temperature state. Wherein, in the preheating procedure, the upper and lower surfaces of the substrate 100 are heated by the heating unit 44, and the first predetermined temperature is between 60° C. and 105° C. Then, the preheated substrate 100 together with the frame 50 is transported to the pressurizing and shaping unit 45 for proceeding with the cooling and molding process of Step 93 shown in FIG. 13, in order to pressure-mold the substrate 100 by using the mold 60 under a second predetermined temperature state. The mold 60 comprises a top mold 61 and a bottom mold 62. The substrate 100 together with the feeding rack 50 is firstly positioned between the top mold 61 and the bottom mold 62, and then, the mold 60 is pushed by the pressurizing and shaping unit 45, causing the upper mold 61 and the lower mold 62 to respectively press on the upper and lower surfaces of the substrate 100 at the second predetermined temperature state, such that, the substrate 100 is forced to be deformed into a curved surface structure conforming to the shapes of inner surfaces of the upper mold 61 and the lower mold 62. After the cooling and molding process is completed, the feed frame 50 is taken out together with the curved substrate 100 by the moving-arm mechanism 46 and sent to the discharging unit 47, so as to transport the curved substrate 100 to another processing machine (such like CNC milling machine) to perform the processing procedure described in Step 94 shown in FIG. 13.

Please refer to FIGS. 16A to 16D, which respectively are the schematic drawings of four pressure-molding operations of the pressure-molding process in the method for fabricating the light-transmissive plastic plate structure with a curved surface according to the present invention. As shown in FIGS. 16A to 16D, the pressure-molding process of Step 93 includes the following operations in order.

Figure 16A:
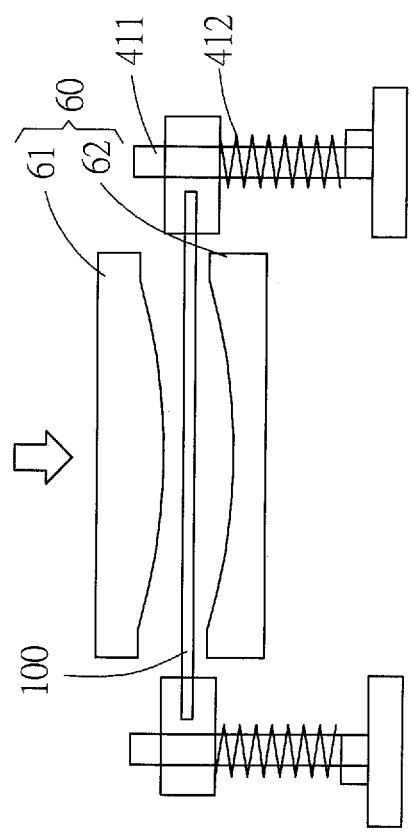
FIGS. 16A to 16D respectively are the schematic drawings of four pressure-molding operations of the pressure-molding process in the method for fabricating the light-transmissive plastic plate structure with a curved surface according to the present invention.

(I) Feeding operation. As shown in FIG. 16A, the feed rack 50 and the substrate 100 are positioned between the top mold 61 and the bottom mold 62. The substrate 100 is separated from the top mold 61 and the bottom mold 62 by a gap. In this step, the temperatures of the substrate 100, the top mold 61 and the bottom mold 62 are adjusted to the second predetermined temperature by a cooling process; wherein, the second predetermined temperature is between 40° C. and 60° C. In addition, a predetermined curved surface is provided on each of the surfaces of the top mold 61 and the bottom mold 62 facing the substrate 100.

Figure 16B:
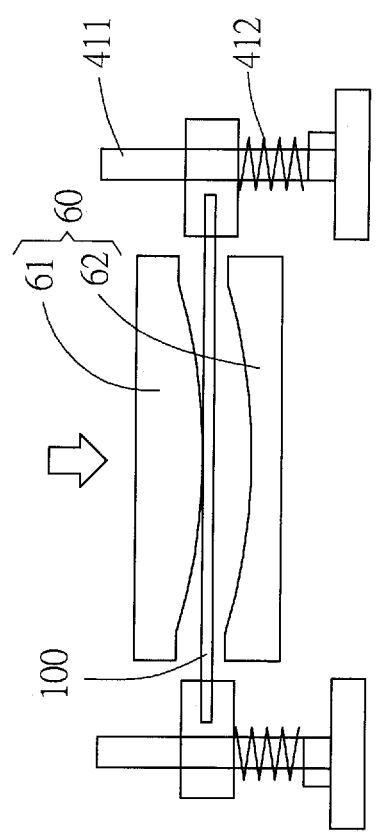

(II) Contacting operation of the convex of top mold. As shown in FIG. 16B, the top mold 61 is pushed by the pressurizing and shaping unit 45, such that the top mold 61 moves downward along the guide rod 411, compresses the spring 412, and contacts the upper surface of the substrate 100. The bottom mold 62 is not in contact with the substrate 100 at this time.

Figure 16C:
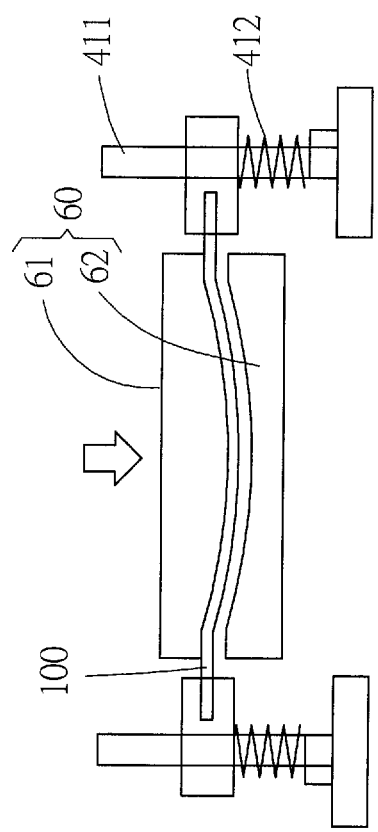

(III) Upper curving operation of the substrate. As shown in FIG. 16C, the top mold 61 is continuously pushed by the pressurizing and shaping unit 45, such that the top mold 61 continues to move downward and presses the upper surface of the substrate 100, until the upper surface of the substrate 100 is deformed due to compression to conform to the predetermined curved surface (convex surface) of the top mold 61. At this time, there is still a gap between the substrate 100 and the bottom mold 62 and there is no contact between the substrate 100 and the bottom mold 62.

Figure 16D:
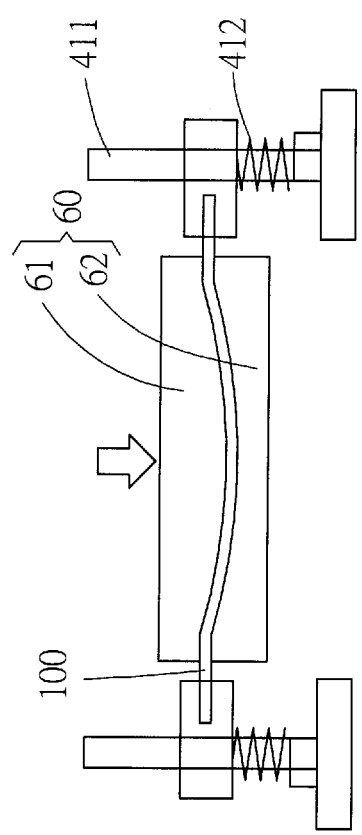

(III) Lower curving operation of the substrate. As shown in FIG. 16D, the bottom mold 62 is pushed by the pressurizing and shaping unit 45 in order to move the bottom mold 62 upward and press the lower surface of the substrate 100, until the lower surface of the substrate 100 is deformed by the compression to conform to the predetermined curved surface of the bottom mold 62. At this moment, the substrate 100 has been tightly pressed by the top mold 61 and the bottom mold 62.

(V) Saturated compressed cooling operation. As shown in FIG. 16D, when the pressurizing and shaping unit 45 continues to press the top and bottom molds 61 and 62 to keep the substrate 100 pressed, the substrate 100 is subjected to a cooling process, until the substrate 100 is cooled down to a third predetermined temperature. Wherein, the third predetermined temperature is between 25° C. and 45° C. After then, the pressurizing and shaping unit 45 drives the top and bottom molds 61 and 62 to leave the substrate 100, and then the feed rack 50 and the substrate 100 are taken out of the mold 60 by the moving-arm mechanism 46.

Figure 17:
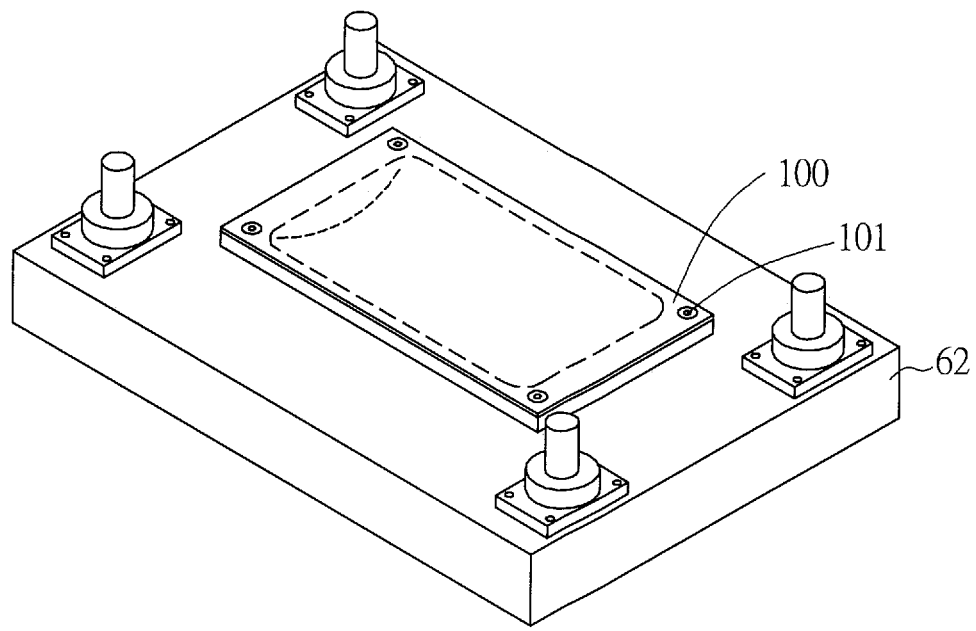
FIG. 17 is a schematic diagram of an embodiment of the bottom mold in the method for fabricating a light-transmissive plastic plate structure with curved surface according to the present invention.

As shown in FIG. 17, which is a schematic diagram of an embodiment of the bottom mold in the method for fabricating a light-transmissive plastic plate structure with curved surface according to the present invention. A plurality of positioning holes 101 can be formed on the substrate 100 by the plurality of posts furnished on the bottom mold 62.

Figure 18:
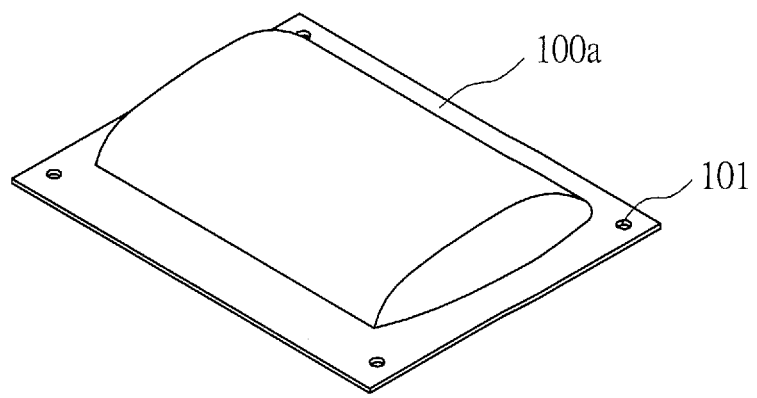
FIG. 18 is a schematic diagram of an embodiment of a semi-finished substrate in the manufacturing method of the light-transmissive plastic plate structure with a curved surface according to the present invention.

Please refer to FIG. 18, which is a schematic diagram of an embodiment of a semi-finished substrate in the manufacturing method of the light-transmissive plastic plate structure with a curved surface according to the present invention, especially when the substrate has completed the pressure-molding process but has not yet performed a cutting process. In which, the semi-finished substrate 100a is formed with a plurality of said positioning holes 101.

Figure 19:
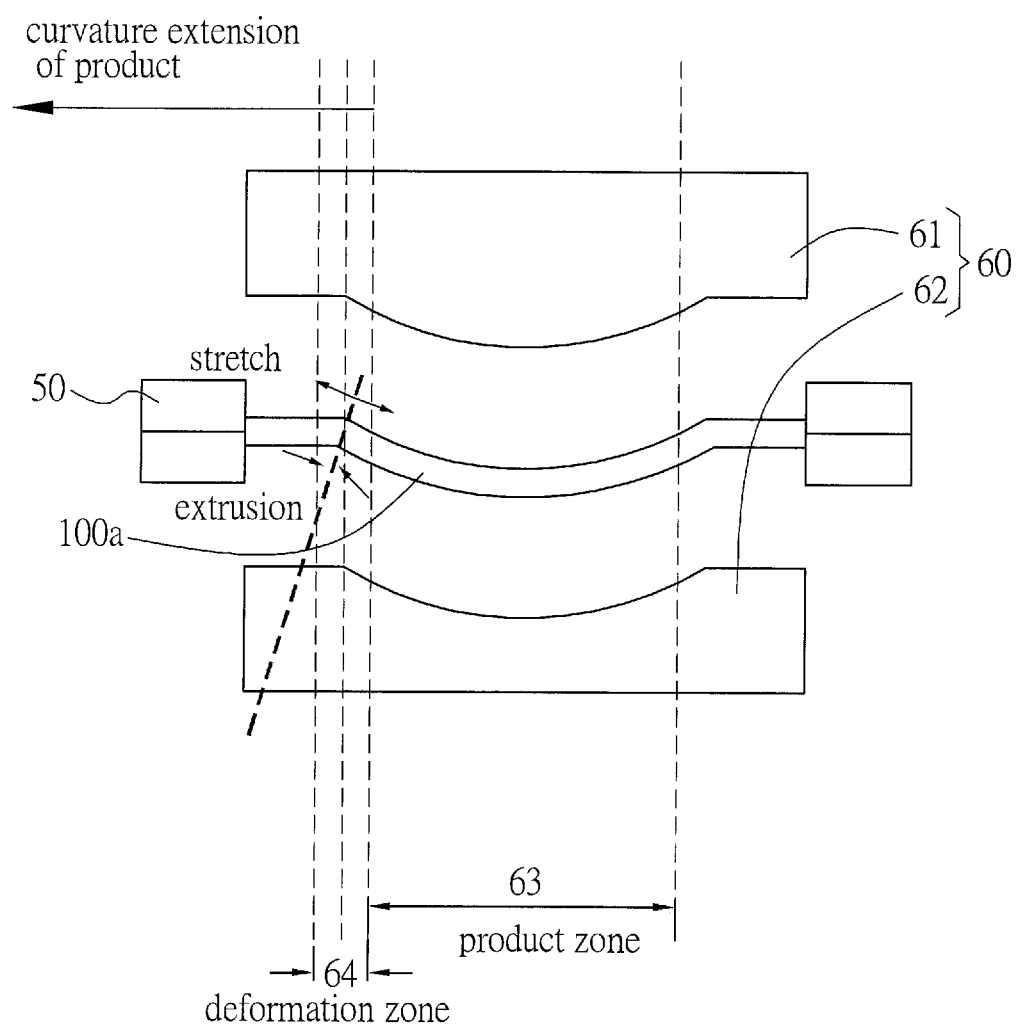
FIG. 19 is a schematic drawing of the semi-finished substrate during the pressure-molding process in the method for fabricating the light-transmissive plastic plate structure with a curved surface according to the present invention.
Figure 20:
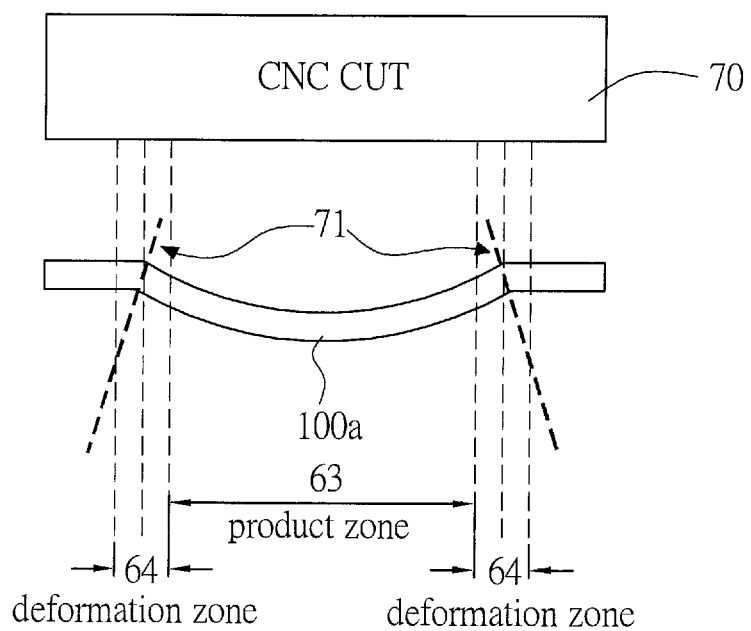
FIG. 20 is a schematic drawing of the semi-finished substrate during the cutting process in the method for fabricating the light-transmissive plastic plate structure with a curved surface according to the present invention.

Please refer to FIG. 19, which is a schematic drawing of the semi-finished substrate during the pressure-molding process in the method for fabricating the light-transmissive plastic plate structure with a curved surface according to the present invention. As shown in FIG. 19, after the pressurizing and shaping unit 45 compresses the upper and lower surfaces of the substrate 100a with the top mold 61 having a convex surface and the bottom mold 62 having a concave surface, respectively, the substrate 100a is extruded to conform to the shapes of the surfaces of the top and bottom molds 61, 62 and thereby is formed with the curved surface. However, due to the hot pressing, a deformation zone 64 is formed on the substrate 100a, which is located at the outer peripheral area and is subjected to a large amount of tensile and compression deformation. Therefore, the quality of the deformation zone 64 is relatively unstable, and it is not suitable for use as a finished product of car sunroof panels. Therefore, as shown in FIG. 20, which is a schematic drawing of a cutting process in the method for fabricating the light-transmissive plastic plate structure with a curved surface according to the present invention. In this cutting process, the shape of the substrate 100a is cut by a CNC milling machine 70 or another type of processing machine. In which, the deformation zone 64 that is not suitable for use as a finished product is formed on the substrate 100a because of the pressure-molding process. Therefore, the cutting location 71 (cutting path) of the CNC milling machine 70 for cutting the substrate 100a will fall on the substrate 100a within the range of the deformation zone 64, in order to make a plastic plate with a predetermined profile; wherein, the plastic plate after the cutting process is mainly located in the product zone 63 of the semi-finished substrate 100a.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A light-transmissive plastic plate structure with curved surface, comprising:
    a substrate, said substrate at least comprising a transparent hard plastic material and having an outer surface and an inner surface opposite to the outer surface;
    a primer layer, furnished at an outer rim area of the inner surface of the substrate;
    a connecting structure, fixed to the outer rim area of the inner surface of the substrate at a position having the primer layer; and
    at least one sealing ring layer; said sealing ring layer being disposed on a surface of the primer layer facing the connecting structure, such that the sealing ring layer is sandwiched between and fully covered by adjoining surfaces of the primer layer and the connecting structure;
    wherein:
    the substrate has a curved surface at least at the outer rim area of the inner surface;
    the connecting structure has an L-shaped structure in sectional view and is for connecting to an external component, such that the substrate can be connected to the external component through the connecting structure;
    the connecting structure is made of hard plastic material or metal material; wherein, when the connecting structure is made of hard plastic material, the connecting structure is molded and fixed on the outer rim area of the inner surface of the substrate having the primer layer by using an insert-molding injection process; when the connecting structure is made of metal material, the connecting structure is adhered and fixed to the outer rim area of the inner surface of the substrate at a position having the primer layer by using the primer layer as an adhesive;
    the primer layer is for providing good adhesion effect between the substrate and the connecting structure;
    each said sealing ring layer is applied on the surface of the primer layer facing the connecting structure by a dispensing method, and is extending in a ring shape around the outer rim area of the inner surface of the substrate having the primer layer; the material of the sealing ring layer includes one of the following: silicone and polyurethane (PU), which is for improving the sealing effect between the substrate and the connecting structure.

2. The light-transmissive plastic plate structure with curved surface of claim 1, wherein:
   in addition, the hard plastic material of the connecting structure includes at least one of the following: polymethyl methacrylate (PMMA), polycarbonate (PC), acrylonitrile butadiene styrene (ABS), polypyromellitimide (PMMI), polyethylene terephthalate (PET), polyethylene 2,6-naphthalene dicarboxylate (PEN), polyethersulfone (PES), and Polyimide (PI); primer layer as an adhesive;
   the primer layer comprises one of the following materials: compounds of amines and heterocyclic amines, silane compounds, and polyurethane (PU).

3. The light-transmissive plastic plate structure with curved surface of claim 1, wherein:
   the substrate is a multilayer structure comprising at least three layers of different materials formed by coextrusion process, which comprises: a plastic layer located at middle and having polycarbonate (PC), an upper acrylic layer located above the plastic layer, and a lower acrylic layer located under the plastic layer; an upper hard coating layer is formed above the upper acrylic layer, and a lower hard coating layer is formed below the lower acrylic layer;
   a coated film layer having a multilayer film structure is further provided on at least the upper hard coating layer of the substrate; the coated film layer comprises: a cohesive layer, a UV-cut layer and a wear-resistant layer; wherein, the material of the cohesive layer includes $SiO_2$; the material of the UV-cut layer includes $Ti_3O_5$; The material of the wear-resistant layer includes $SiO_2$.

4. The light-transmissive plastic plate structure with curved surface of claim 3, wherein, the coated film layer further comprises an IR-cut layer.

5. The light-transmissive plastic plate structure with curved surface of claim 3, wherein a top hard coating layer is further furnished on a top of the coated film layer.

* * * * *